United States Patent
Ito et al.

(10) Patent No.: US 6,597,131 B2
(45) Date of Patent: Jul. 22, 2003

(54) DISCHARGE LAMP LIGHTING CIRCUIT

(75) Inventors: Masayasu Ito, Shizuoka (JP); Hitoshi Takeda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/066,416

(22) Filed: Jan. 31, 2002

(65) Prior Publication Data

US 2002/0117971 A1 Aug. 29, 2002

(30) Foreign Application Priority Data

Jan. 31, 2001 (JP) ........................................ 2001-023790

(51) Int. Cl.[7] ................................................ G05F 1/00
(52) U.S. Cl. ........................ 315/308; 315/307; 315/291; 315/224; 315/209 R
(58) Field of Search ................................ 315/308, 307, 315/291, 224, 209 R, 219, DIG. 7

(56) References Cited

U.S. PATENT DOCUMENTS

| | | | |
|---|---|---|---|
| 5,434,474 A | * 7/1995 | Ukita et al. ............... | 315/128 |
| 5,705,898 A | 1/1998 | Yamashita et al. .......... | 315/308 |
| 6,340,870 B1 | * 1/2002 | Yamashita et al. .......... | 315/308 |

FOREIGN PATENT DOCUMENTS

| | | |
|---|---|---|
| JP | 2001-006886 | 1/2001 |
| JP | 2001-006891 | 1/2001 |
| JP | 2001-257092 | 9/2001 |

* cited by examiner

*Primary Examiner*—Don Wong
*Assistant Examiner*—Tuyet T. Vo
(74) *Attorney, Agent, or Firm*—Fish & Richardson P.C.

(57) ABSTRACT

In a lighting circuit 1A, there are provided a DC power circuit 3' for outputting DC voltages having positive and negative polarities and a DC-AC converting circuit 4A for converting the output voltages into AC voltages through a plurality of switching elements and for then supplying the AC voltages to a plurality of discharge lamps 6_1 and 6_2. In the case in which each discharge lamp is to be lighted up, a polarity fixing period is set to define the polarity of the voltage to be supplied from the DC-AC converting circuit 3' to the discharge lamp before and after the discharge lamp is lighted up to be positive or negative. For this period, control is carried out such that a current flowing to the discharge lamp does not exceed a predetermined limit current value. Consequently, when a first discharge lamp has already been lighted up and a second discharge lamp is to be lighted up, it is possible to relieve the influence of a thermal stress applied to the first discharge lamp by the control of an output polarity for the discharge lamp.

3 Claims, 17 Drawing Sheets

DISCHARGE LAMP LIGHTING CIRCUIT

BACKGROUND OF THE INVENTION

The present invention relates to a technique for preventing a deterioration in a discharge lamp and a reduction in a lifetime which are caused by a thermal stress in a discharge lamp lighting circuit for carrying out the lighting control of a plurality of discharge lamps.

For a circuit for lighting a discharge lamp (a metal halide lamp), there has been known a structure in which a DC power circuit, a DC-AC converting circuit and a starting circuit (a so-called starter circuit) are provided. For example, in such a structure that a DC-DC converter is used for the DC power circuit and a full bridge type circuit (which is constituted to set four semiconductor switching elements in two pairs respectively and to carry out ON/OFF control) and a driver circuit thereof are used for the DC-AC converting circuit, a voltage having a positive polarity (or a negative polarity) output from the DC-DC converter is converted into a rectangular wave-shaped voltage in the full bridge type circuit and is then supplied to the discharge lamp.

In order to enhance the lighting property of the discharge lamp, it is preferable that the polarity of a voltage to be supplied to the discharge lamp should be temporarily fixed to provide a DC period (hereinafter referred to as an "after-lighting polarity fixing period") immediately after the discharge lamp is lighted up (or it breaks down).

FIG. 20 is a diagram schematically showing the current waveform of a rectangular wave output to be supplied to the discharge lamp.

In the drawing, a time shown in an arrow "ST" indicates a time that the discharge lamp is lighted up through a starting pulse, and a period "Tdcf" having a predetermined width immediately thereafter indicates a first half of the after-lighting polarity fixing period and a period "Tdcr" indicates a second half (having a reverse polarity to a polarity in Tdcf) of the after-lighting polarity fixing period.

However, the duration of the after-lighting polarity fixing period is to be somewhat limited because a period in which the polarity of a supplied voltage is fixed is increased in such a situation that a lighting state is not immediately brought even if a starting pulse having a high voltage generated by the starting circuit is applied to the discharge lamp, for example. Consequently, the following problems arise.

In the case in which a structure of a bootstrap type is employed for the driving circuit of a semiconductor switching element constituting a DC-AC converting circuit, it is necessary to maintain a quantity of electric charges stored in a capacitor through a power supply. Therefore, the capacity of the capacitor should be set to have a great value.

In a lighting circuit having such a structure that lighting control for a plurality of discharge lamps can be carried out by a common circuit, in the case in which some of the discharge lamps have already been lighted up and the other discharge lamps are to be lighted up, a state in which the polarity of the supplied voltage of the lighted discharge lamp is fixed is continuously maintained for a long period of time when the other discharge lamps are not brought into the lighting state. Therefore, there is a possibility that a bad influence (a reduction in a lifetime or a deterioration) might be caused by the application of a thermal stress to the electrode of the discharge lamp.

Before the discharge lamp is lighted up, similarly, it is preferable that the polarity of the voltage to be supplied to the discharge lamp should be temporarily fixed to provide a DC period (which will be hereinafter referred to as a "before-lighting polarity fixing period"). This period is indicated as "Tdcb" in FIG. 20 (which has the same polarity as that of the period "Tdcf"). If the duration of the before-lighting polarity fixing period is not limited, the same problems arise.

By placing restrictions in time such that the duration of the before-lighting polarity fixing period and the after-lighting polarity fixing period do not exceed a constant time, the capacity of the capacitor of a bootstrap corresponding to a time limit can be set and the influence of a thermal stress on the discharge lamp can be reduced.

In the method described above, however, an insufficient countermeasure is taken against the thermal stress and the following drawbacks are caused.

Referring to the polarity fixing period permitted for the discharge lamp, the upper bound determined by a product of a current and a time (a so-called current-time product) is set to each polarity in consideration of the lifetime of the discharge lamp. In other words, when a larger current is to flow to the discharge lamp with the polarity fixed, the duration of the polarity fixing period in which the same current is to flow should be reduced.

If it is assumed that the lighting control of two discharge lamps is to be carried out in a circuit, the discharge lamp lighted earlier has a current waveform shown in FIG. 20 when the discharge lamp to be lighted later is lighted up. In the case in which the current-time product has an allowance of 20 to 30 A·mS (A: ampere, mS; millisecond), it is assumed that the limit range of a duration for the before-lighting polarity fixing period Tdcb is set to 16 mS in consideration of a time taken until the capacitor in the starting circuit is fully charged. If the current value of the discharge lamp lighted earlier is 2.5 A, the current-time product is 16·2.5=40 A·mS to exceed the allowance.

The cause is that the time limit for the polarity fixing period is uniformly defined. Consequently, it is preferable that the duration of the polarity fixing period (in which the DC lighting is carried out with the polarity fixed) should be determined by a time taken until the product of the time and the value of a current flowing to the discharge lamp has a predefined value. In other words, the duration of the period is reduced when the current value of the discharge lamp is great, and the duration of the period is increased when the current value is small. Therefore, it is possible to dynamically limit the duration of the polarity fixing period corresponding to the state of the discharge lamp. For example, in the case in which two discharge lamps are to be lighted up, a greater one of the values of the currents flowing to the discharge lamps is employed and the duration of the polarity fixing period is limited by a time obtained by dividing a defined current-time product by the current value so that both of the discharge lamps do not exceed the defined current-time product.

However, the first half Tdcf of the after-lighting polarity fixing period arrives subsequently to the before-lighting polarity fixing period Tdcb and the same polarity is set during both periods as shown in FIG. 20, for example (because the lighting state becomes unstable if the polarity is changed when the discharge lamp is lighted up after the arrow ST). Consequently, the same result as that in the extension of the period Tdcb is produced so that a deterioration in the discharge lamp and a reduction in the lifetime are adversely affected. In order to reduce the influence such as a deterioration as much as possible while maintaining the lighting performance of the discharge lamp, it is necessary to set, to the allowance, the current-time-product during the polarity fixing period before and after the lighting.

SUMMARY OF THE INVENTION

Therefore, it is an object of the invention to reduce the influence of a thermal stress applied to a plurality of discharge lamps in lighting control for the discharge lamps, thereby preventing a reduction in a lifetime and a deterioration.

In order to attain the object, the invention provides a discharge lamp lighting circuit comprising a DC power circuit for outputting DC voltages having positive and negative polarities and a DC-AC converting circuit for converting an output voltage of the DC power circuit into an AC voltage through a plurality of switching elements and then supplying the AC voltage to a plurality of discharge lamps, wherein in the case in which the discharge lamp is to be lighted up, a polarity fixing period is set to define a polarity of a voltage to be supplied from the DC-AC converting circuit to the discharge lamp before or after the discharge lamp is lighted up or before and after the discharge lamp is lighted up to be positive or negative, and a current flowing to the discharge lamp for the period is controlled so as not to exceed a predetermined limit current value.

According to the invention, therefore, the value of the current flowing to the discharge lamp is restricted for the polarity fixing period in which the voltage to be supplied to the discharge lamp is fixed to one of the polarities before or immediately after the discharge lamp is lighted up. Consequently, a deterioration can be prevented from being caused by a thermal stress applied to the discharge lamp.

DETAILED DESCRIPTION OF THE PREFERRED EMBODIMENTS

Figure 1:
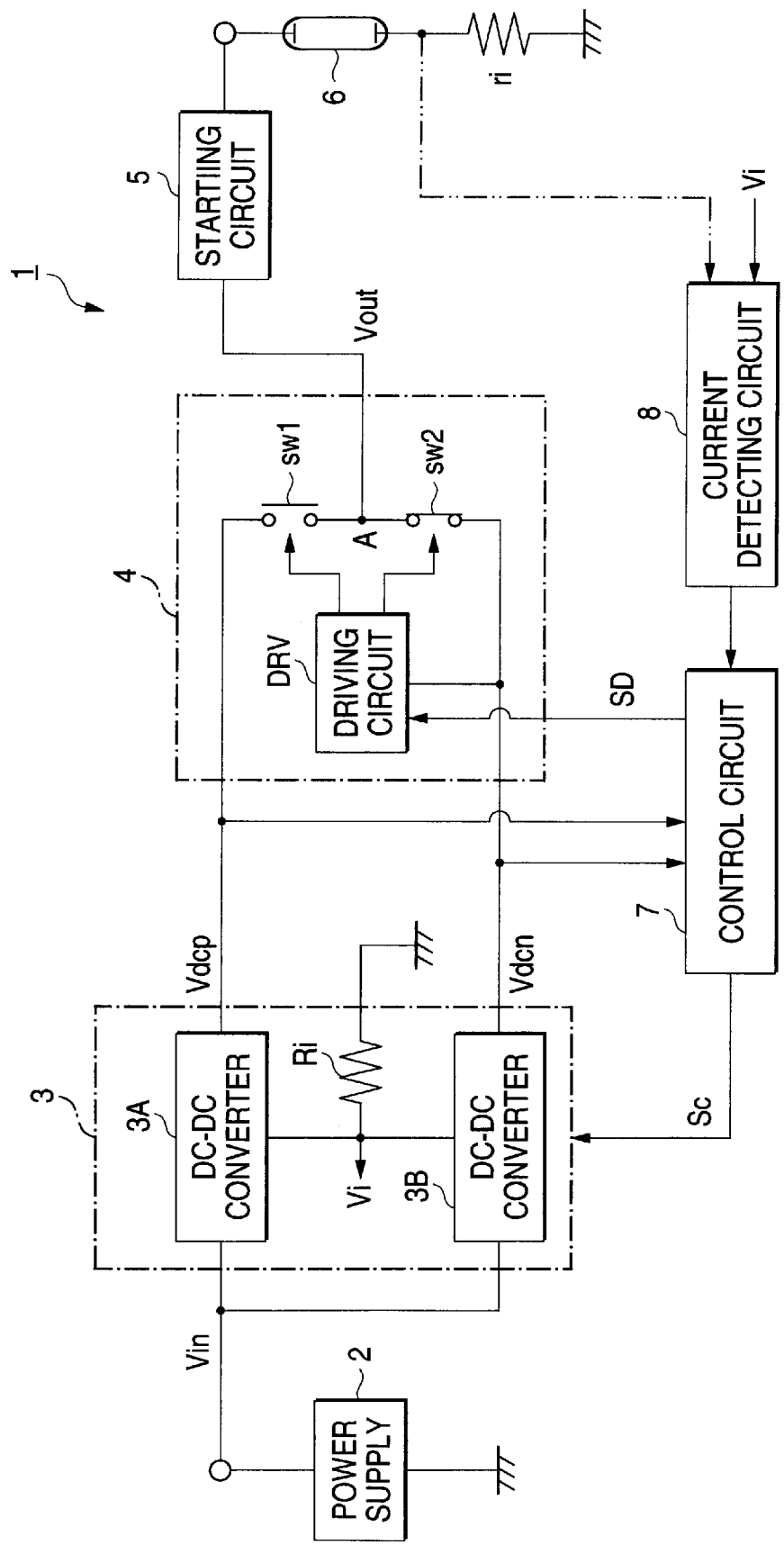
FIG. 1 is a circuit block diagram showing the basic structure of a discharge lamp lighting circuit according to the invention.

Before the description of the structure of a lighting circuit according to the invention, the basic structure of a circuit for one discharge lamp will be described with reference to FIG. 1.

A discharge lamp lighting circuit 1 comprises a power supply 2, a DC power circuit 3, a DC-AC converting circuit 4 and a starting circuit 5.

The DC power circuit 3 serves to output a desired DC voltage upon receipt of a DC input voltage (indicated as "Vin") applied from the power supply 2 and an output voltage thereof is variably controlled in response to a control signal sent from a control circuit 7. While a DC-DC converter (of a chopper type or a flyback type) having the structure of a switching regulator is used for the DC power circuit 3, a first circuit portion (a DC-DC converter 3A) for obtaining a voltage output having a positive polarity (a positive voltage output) and a second circuit portion (a DC-DC converter 3B) for obtaining a voltage output having a negative polarity (a negative voltage output) are provided in parallel with each other.

Figure 2:
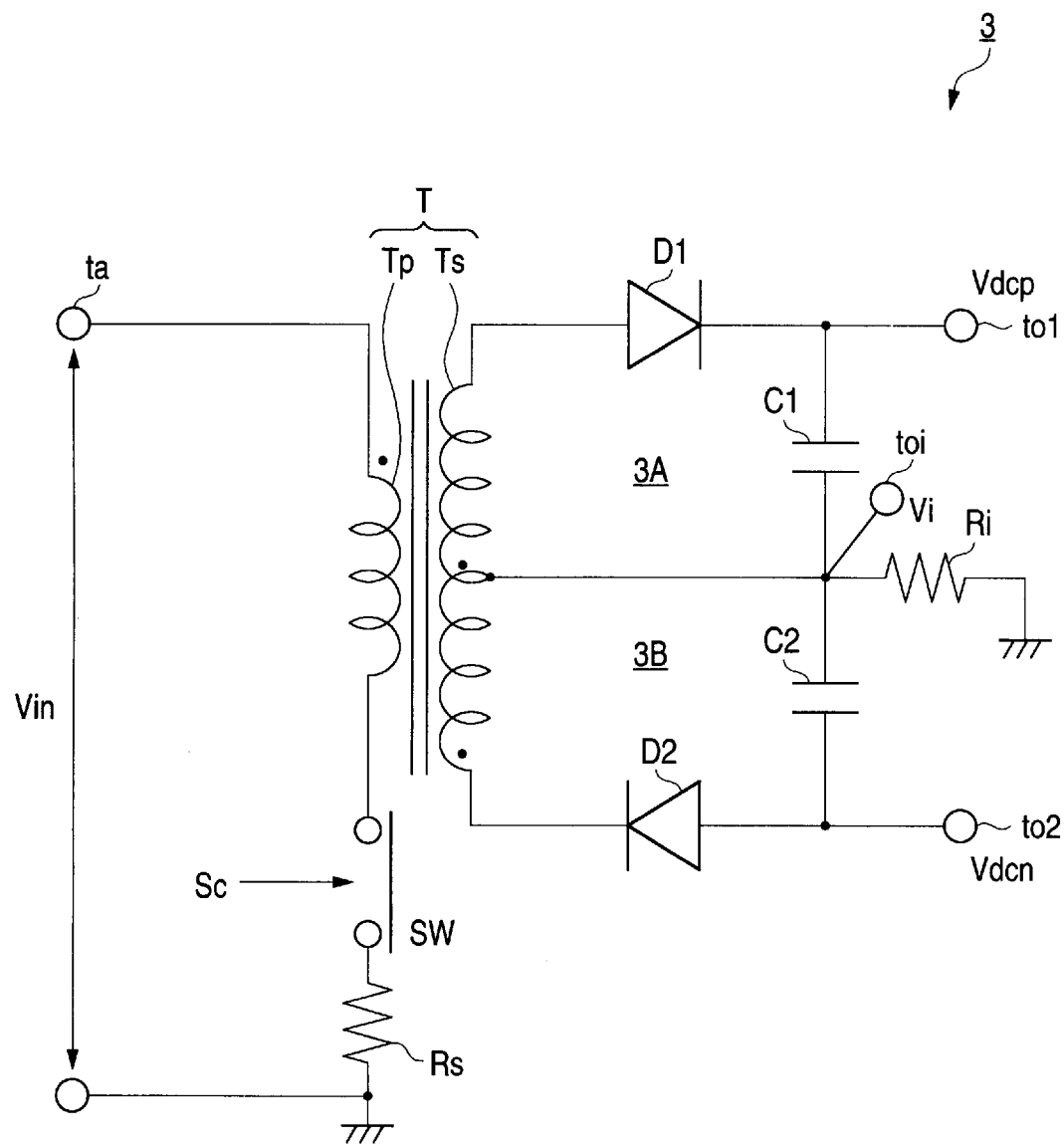
FIG. 2 is a circuit diagram showing an example of the structure of a DC power circuit.
Figure 3:
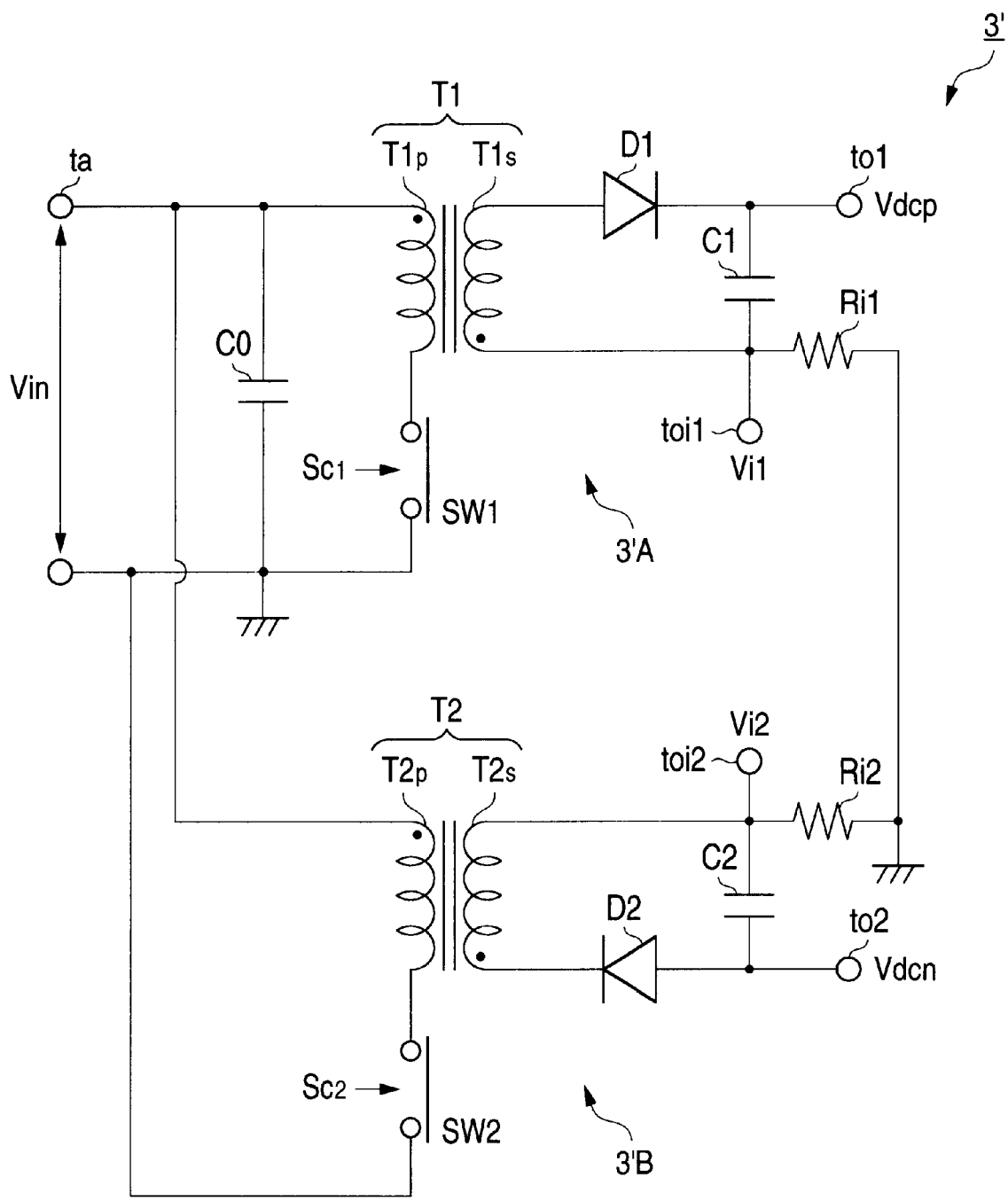
FIG. 3 is a circuit diagram showing another example of the structure of the DC power circuit.

FIGS. 2 and 3 show examples of the structure of the DC power circuit.

In the example shown in FIG. 2, one of the ends of a primary winding Tp of a transformer T is connected to a DC input terminal "ta" so that a voltage Vin is input, and the other end of the primary winding Tp is grounded through a semiconductor switching element SW (which is simply indicated by the symbol of a switch in the drawing and for which an FET (field effect transistor) is used) and a resistor Rs for current detection (the resistor Rs is optional and does not particularly need to be provided) A signal "Sc" is sent from the control circuit 7 to the control terminal (a gate in the FET) of the semiconductor switching element SW. Thus, switching control is carried out.

One of the ends of a secondary winding Ts of the transformer T is connected to the anode of a diode D1, and the cathode of the diode D1 is connected to one of the ends of a capacitor C1 and is connected to a terminal "to1 " so that an output voltage (indicated as "Vdcp") is obtained from the same terminal. The other end of the capacitor C1 is connected to the center tap of the secondary winding Ts and is grounded through a resistor Ri.

The other end of the secondary winding Ts is connected to the cathode of a diode D2 and the anode of the diode D2 is connected to a capacitor C2 and a terminal "to2" so that an output voltage (indicated as "Vdcn") is obtained through the terminal.

The resistor Ri is an element for current detection to obtain a detection signal related to a current flowing to a discharge lamp 6 and serves to convert a current flowing to the resistor into a voltage, thereby detecting the current. A detection terminal "toi" is connected to the node of the resistor Ri and the capacitors C1 and C2, from which a detection signal "Vi" is obtained.

As described above, the DC power circuit 3 outputs the voltages Vdcp and Vdcn having positive and negative polarities from the two output terminals "to1" and "to2" respectively.

A mark "•" shown in the winding of the transformer T indicates a winding start. For example, the mark "•" is attached to the connecting end of the secondary winding Ts and the diode D2 and a winding start end in the center tap, respectively.

Moreover, a DC power circuit 3' shown in FIG. 3 is constituted to have transformers T1 (a primary winding T1p and a secondary winding T1s) and T2 (a primary winding T2p and a secondary winding T2s).

One of the terminals of each of the primary windings T1p and T2p in the transformers is connected to the DC input terminal ta and the other terminal is grounded through each of switching elements SW1 and SW2 (for which a semiconductor switching element is used and which is simply indicated by the symbol of a switch in the drawing). By ON/OFF controlling the switching elements SW1 and SW2 in response to control signals Sc1 and Sc2 sent from the control circuit 7 respectively, each secondary output can be variably controlled independently.

A capacitor C0 provided in parallel with the primary windings T1p and T2p has one of ends connected to the DC input terminal ta and the other end grounded.

A DC-DC converter 3'A includes the transformer T1 and the switching element SW1, the rectifying diode D1 and the smoothing capacitor C1 which are connected to the secondary winding T1s, and a resistor Ri1 for current detection. In other words, one of the ends of the secondary winding T1s is connected to the anode of the diode D1, and the cathode of the diode is connected to the output terminal to1 and to one of the ends of the capacitor C1. Then, the other end of the capacitor C1 is connected to a terminal on the winding start end side of the secondary winding T1s and is grounded through the resistor Ri1 for current detection.

In the circuit portion, accordingly, the current flowing to the primary winding T1p of the transformer T1 is controlled by the ON/OFF control of the switching element SW1 based on the control signal Sc1, and a voltage Vdcp having a positive polarity is given from the second winding T1s to the output terminal to1 through the diode D1 and the capacitor C1. A terminal "toi1" is a current detection terminal connected to the node of the capacitor C1 and the resistor Ri1 for current detection and a detection signal "Vi1" is obtained from the same terminal.

On the other hand, a DC-DC converter 3'B includes the transformer T2 and the switching element SW2, the rectifying diode D2 and the smoothing capacitor C2 which are connected to the secondary winding T2s, and a resistor Ri2 for current detection. In other words, one of the ends of the secondary winding T2s (a terminal on the winding start end side) is connected to the cathode of the diode D2, and the anode of the diode is connected to the output terminal to2 and to one of the ends of the capacitor C2. Then, the other end of the capacitor C2 is connected to a terminal on the termination side of the secondary winding T2s and is grounded through the resistor Ri2 for current detection.

In the circuit portion, accordingly, the current flowing to the primary winding T2p of the transformer T2 is controlled by the ON/OFF control of the switching element SW2 based on the control signal Sc2, and a voltage Vdcn is given from the second winding T2s to the output terminal to2 through the diode D2 and the capacitor C2. A terminal "toi2" is a current detection terminal connected to the node of the capacitor C2 and the resistor Ri2 for current detection and a detection signal "Vi2" is obtained from the same terminal.

The DC-AC converting circuit 4 (see FIG. 1) is provided in the latter stage of the DC power circuit 3 in order to convert the output voltage of the DC power circuit 3 into an AC voltage and to then supply the AC voltage to the discharge lamp 6, and voltages having positive and negative polarities output from two output terminals of the DC power circuit 3 respectively are sent thereto. In order to switch the output voltage Vdcp of the DC-DC converter 3A and the output voltage Vdcn of the DC-DC converter 3B, a pair of semiconductor switching elements sw1 and sw2 (for which a field effect transistor is used and which is simply indicated by the symbol of a switch in the drawing) provided in the DC-AC converting circuit 4 are alternately operated by a driving circuit DRV thereof. An AC voltage thus generated is supplied to the discharge lamp 6.

More specifically, referring to the two switching elements sw1 and sw2 connected in series in the output stage of the DC power circuit 3, the element sw1 is connected to the output terminal of the DC-DC converter 3A and is connected to the output terminal of the DC-DC converter 3B through the element sw2. Referring to the driving circuit DRV for reciprocally controlling the switching elements respectively, for example, a well-known IC (integrated circuit) is used as a half bridge driver. More specifically, in response to the signal sent from the driving circuit DRV to the control terminals of the switching elements, the half bridge is alternately operated such that the element sw2 is turned OFF when the element sw1 is ON and the element sw2 is turned ON when the element sw1 is OFF. Thus, the DC voltage is converted into the AC voltage.

Figure 4:
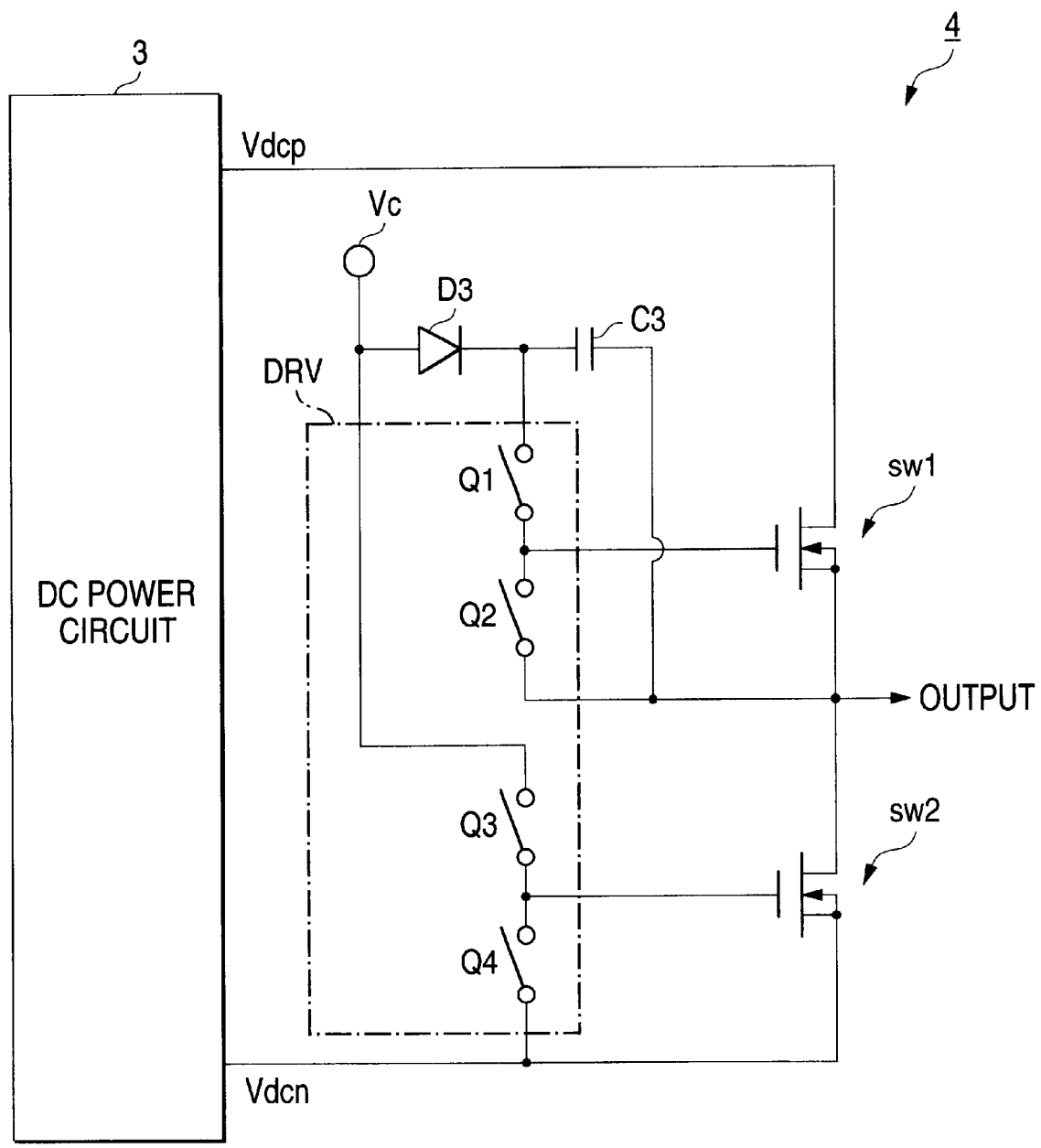
FIG. 4 is a diagram illustrating the structure of a bootstrap type driving circuit.

FIG. 4 shows an example of the structure of a driving circuit of a bootstrap type in which a field effect transistor is used for the elements sw1 and sw2.

In the drawing, the switching element in a driving IC is equivalently indicated by the symbol of a switch. Thus, there are provided a series circuit including two elements Q1 and Q2 and a series circuit including two elements Q3 and Q4.

A power is supplied from a power terminal Vc to the elements Q1 to Q4, and a power is supplied from the power terminal Vc to the elements Q1 and Q2 through a diode D3, and furthermore, a power is exactly supplied from the power terminal Vc to the elements Q3 and Q4. In other words, the cathode of the diode D3 is connected to the node of N-channel FETs sw1 and sw2 through a capacitor C3 and is connected to the element Q1. The node of the elements Q1 and Q2 is connected to the gate of the FET sw1 and a terminal of the element Q2 on the opposite side of the node of the element Q1 is connected to the node of the FETs sw1 and sw2.

On the other hand, one of the ends of the element Q3 is connected to the power terminal Vc, the node of both elements is connected to the gate of the FET sw2, and the terminal of the element Q4 on the opposite side of the node of the element Q3 is connected to (the source of) the FET sw2.

Referring to the elements Q1 to Q4, it is a matter of course that each element is controlled in response to a control signal supplied from the control circuit 7 to the IC for the DRV.

In the circuit, for example, when the FET sw1 positioned in the upper part of the drawing is to be brought into an ON state, it is necessary to once charge the capacitor C3 from the power terminal Vc through the diode D3 and to store electric charges, and to turn ON the FET by using the electric charges (the element Q1 is turned ON and the element Q2 is turned OFF. In order to turn OFF the FET in a lower part at this time, it is preferable that the element Q3 should be turned OFF and the element Q4 should be turned ON).

The starting circuit 5 (see FIG. 1) is provided to generate a high voltage signal for starting (a starting pulse) to the discharge lamp 6, thereby activating the discharge lamp 6. The starting signal is superposed on an AC voltage "Vout" output from the DC-AC converting circuit 4 and is applied to the discharge lamp 6. In other words, the starting circuit 5 includes an inductive load component (an inductance component of the secondary winding of a trigger transformer), and one of the electrode terminals of the discharge lamp 6 is connected to a node A of the two switching elements sw1 and sw2 through the inductive load and the other electrode terminal is connected to a ground (GND) or is grounded through a resistor "ri" for current detection (in the case in which resistors for current detection shown in FIGS. 2 and 3 are not provided).

Examples of a detecting circuit for detecting a voltage or a current related to the discharge lamp 6 include a voltage detecting circuit for detecting the lamp voltage of the discharge lamp or an equivalent voltage in addition to the current detecting circuit 8 (see FIG. 1) for detecting the value of a current flowing to the discharge lamp by using the resistor "Ri" or "ri" for current detection. For a latter example, voltage detecting means (for example, a circuit for detecting an output voltage by using a voltage dividing resistor) is provided immediately after the DC-DC converters 3A and 3B constituting the DC power circuit 3 respectively and a detection signal for an output voltage (Vdcp, Vdcn) detected by the same means can be used as the alternate signal of the detection signal of a voltage applied to the discharge lamp 6.

Figure 5:
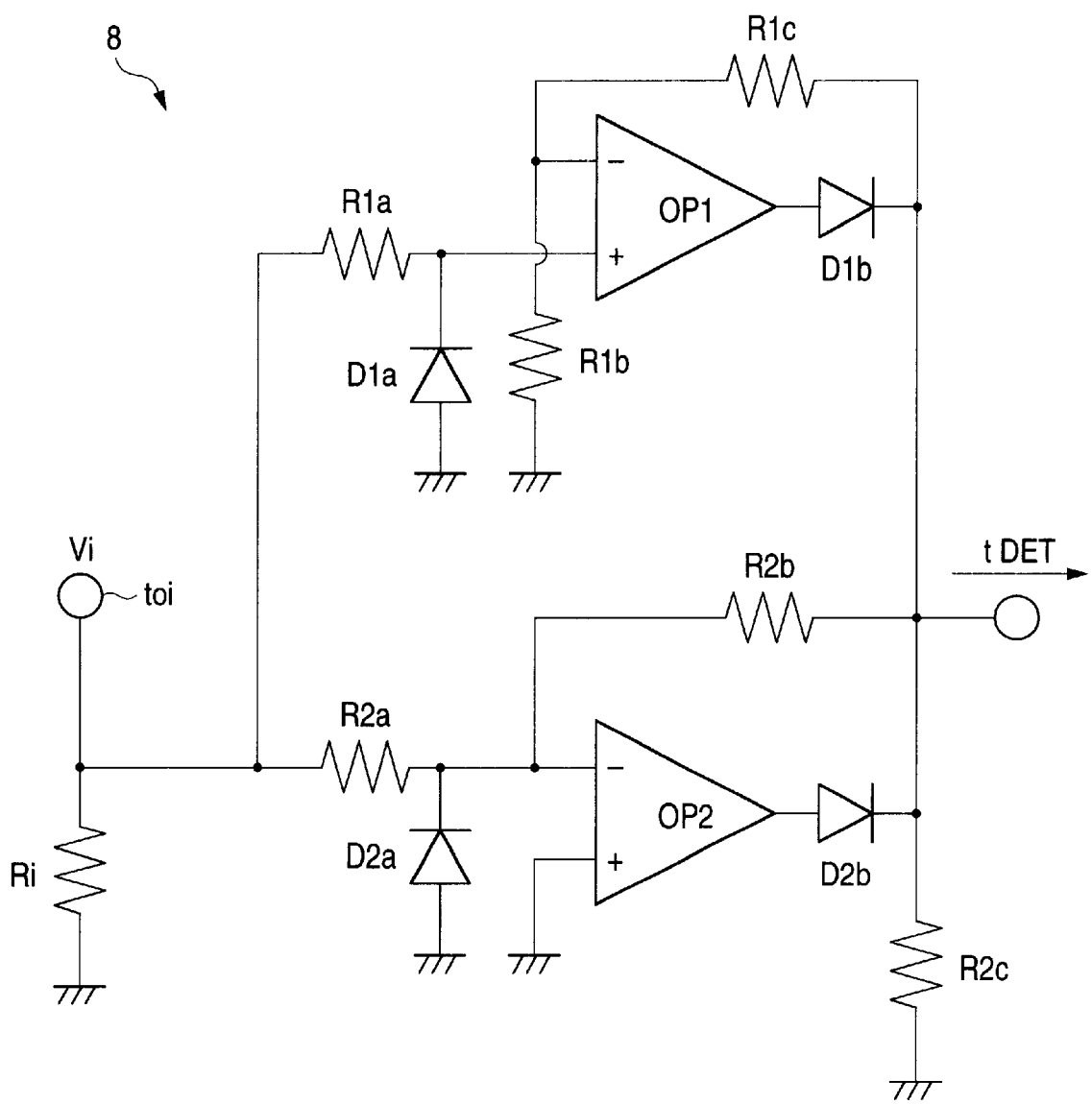
FIG. 5 is a circuit diagram showing an example of the structure of a current detecting circuit.

FIG. 5 shows an example of the structure of the current detecting circuit 8 in which a non-inversion amplifying circuit and an inversion amplifying circuit are provided in parallel with each other against a drop in a voltage which is caused by the resistor Ri for current detection and both output voltages are selectively output.

In FIG. 5, an operational amplifier OP1 constitutes the non-inversion amplifying circuit and a non-inversion input terminal thereof is connected to the detection terminal "toi" (the node of the resistor Ri for current detection and the smoothing capacitors C1 and C2) through a resistor R1a. A diode D1a has a cathode connected to the non-inversion input terminal of the operational amplifier OP1 and an anode grounded (the diode D1a and a diode D2a which will be described below are provided to protect the operational amplifier when an input voltage to be applied to the operational amplifier is inverted to have a negative value).

The output terminal of the operational amplifier OP1 is connected to the anode of the diode D1b, and the cathode of the diode D1b is connected to a current detection output terminal "tDET" and is grounded through a resistor R2c. The inversion input terminal of the operational amplifier OP1 is grounded through a resistor R1b and is connected to the cathode of the diode D1b through a resistor R1c. The resistors R1a, R1b and R1c are set to have the same resistance values.

An operational amplifier OP2 constitutes an inversion amplifying circuit and an inversion input terminal thereof is connected to the detection terminal "toi" through a resistor R2a. The diode D2a has a cathode connected to the inversion input terminal of the operational amplifier OP2 and has an anode grounded.

The output terminal of the operational amplifier OP2 is connected to the anode of a diode D2b, and the cathode of the diode D2b is connected to a current detection output terminal "tDET" and is grounded through the resistor R2c. The inversion input terminal of the operational amplifier OP2 is connected to the cathode of the diode D2b through a resistor R2b (having a resistance value set to a double of the resistance value of the resistor R2a), and furthermore, the non-inversion input terminal of the operational amplifier OP2 is grounded.

In the circuit, a drop in the voltage of the resistor Ri for current detection is amplified to a double voltage through the non-inversion amplifying circuit constituted by the operational amplifier OP1, and is amplified to be a "−2" fold voltage through the inversion amplifying circuit of the operational amplifier OP2. One of the voltages which is higher is selected by the diodes D1b and D2b provided in the output terminal of each operational amplifier and is fetched from the current detection output terminal "tDET". More specifically, when the voltage to be applied to the discharge lamp 6 has a negative polarity, the output voltage of the non-inversion amplifying circuit constituted by the operational amplifier OP1 is obtained from the current detection output terminal "tDET". When the voltage to be supplied to the discharge lamp 6 has a positive polarity, the output voltage of the inversion amplifying circuit constituted by the operational amplifier OP2 is obtained from the current detection output terminal "tDET". The detection voltage thus obtained is used for a signal to decide whether or not the discharge lamp 6 is lighted up or a signal to discriminate the lighting state of the discharge lamp 6 to define a voltage to be supplied.

The control circuit 7 (see FIG. 1) is provided to control the voltage or current of the discharge lamp or the power to be supplied in response to the status detection signal of the discharge lamp 6 which includes a detection signal sent from the current detecting circuit 8, and serves to send a control signal (Sc) to the DC power circuit 3, thereby controlling the output voltage or serves to send a control signal (SD) to the driving circuit DRV, thereby controlling the polarity switching of a bridge. The control circuit 7 also serves to increase a voltage to be supplied to the discharge lamp 6 to a certain level before the discharge lamp 6 is lighted, thereby carrying out output control for reliably causing the discharge lamp 6 to be lighted up.

Before the discharge lamp 6 is lighted up, moreover, the ON/OFF state of each of the switching elements sw1 and sw2 is defined in response to the control signal sent from the control circuit 7 to the driving circuit DRV and the polarity of the voltage to be supplied from the DC-AC converting circuit 4 to the discharge lamp 6 is defined to be positive or negative before the discharge lamp 6 is lighted up. The control circuit 7 includes polarity inverting means for deciding whether or not the duration of the before-lighting polarity fixing period exceeds a predefined upper limit time to forcibly invert the polarity of the voltage (a more specific example of the circuit will be described below). In other words, if a time limit is predetermined for the before-lighting polarity fixing period, it is possible to eliminate the drawback that the time limit is exceeded and the polarity of the voltage supplied to the discharge lamp continues for a long time.

Figure 6:
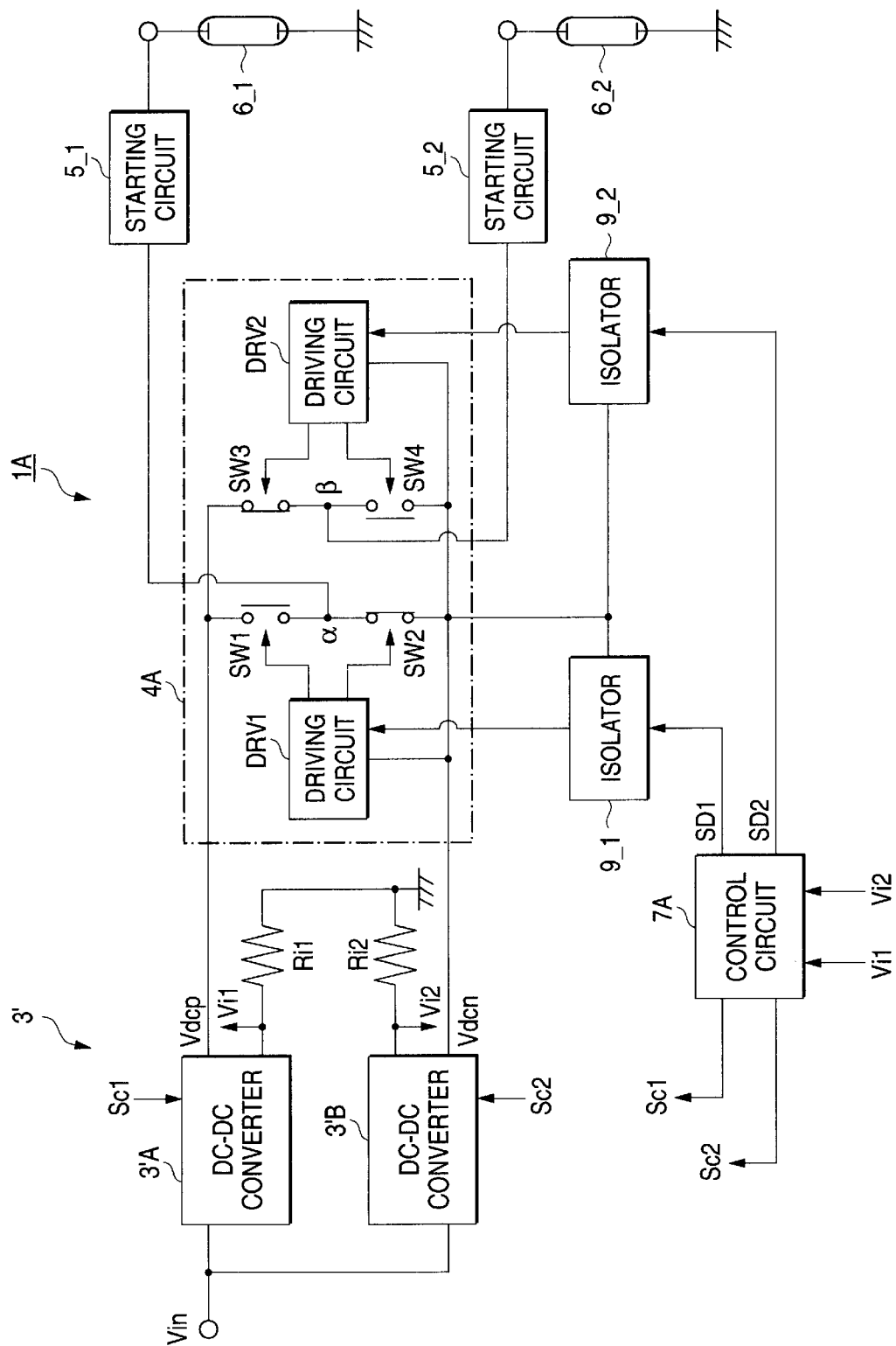
FIG. 6 is a diagram showing an example of a circuit structure in which two discharge lamps are lighted up.

In order to expand the circuit shown in FIG. 1 into a circuit capable of carrying out lighting control for two discharge lamps, in the case in which the structure shown in FIG. 3 is used for a DC power circuit for obtaining DC outputs having positive and negative polarities and a DC-AC converting circuit 4A having a full bridge type circuit structure using four semiconductor switching elements is employed as in a lighting circuit 1A shown in FIG. 6, for example, a thermal stress applied to the lighted discharge lamp becomes a problem when one of the two discharge lamps has already been lighted up and the other discharge lamp is to be lighted up.

In FIG. 6, referring to the switching elements sw1 and sw2 which are connected in series to make a first pair, one of the ends of the switching element sw1 is connected to the output terminal of the DC-DC converter 3'A and the other end of the switching element sw1 is connected to the output terminal of the DC-DC converter 3'B through the switching element sw2. A first discharge lamp 6_1 is connected to a node α of both switching elements through (an inductive load component in) a starting circuit 5_1.

Moreover, referring to the switching elements sw3 and sw4 which are connected in series to make a second pair, one of the ends of the switching element sw3 is connected to the output terminal of the DC-DC converter 3'A and the other end of the switching element sw3 is connected to the output terminal of the DC-DC converter 3'B through the switching element sw4. A second discharge lamp 6_2 is connected to a node β of both switching elements through (an inductive load component in) a starting circuit 5_2.

The electrode terminals in the discharge lamps 6_1 and 6_2 which are not connected to the nodes α and β are grounded. In the case in which the resistors Ri1 and Ri2 for current detection are not used, it is preferable to employ such a structure that one of the ends of each discharge lamp is grounded through an alternate resistor for detection.

An IC for a half bridge driver is used for both of driving circuits DRV1 and DRV2, and they define the polarity of a bridge upon receipt of a signal sent from a control circuit 7A respectively.

In a DC-AC converting circuit 4A having a plurality of switching elements sw1 to sw4, the driving circuit DRV1 serves to carry out the ON/OFF control of the switching elements sw1 and sw2 and the driving circuit DRV2 serves to carry out the ON/OFF control of the switching elements sw3 and sw4. More specifically, assuming that the state of each element is defined such that the switching element sw1 is turned ON and the switching element sw2 is turned OFF through the driving circuit DRV1 at a certain time, the state of each element is defined such that the switching element sw3 is turned OFF and the switching element sw4 is turned ON through the driving circuit DRV2 at this time. Moreover, assuming that the state of each element is defined such that the switching element sw1 is turned OFF and the switching element sw2 is turned ON through the driving circuit DRV1 at another time, the state of each element is defined such that the switching element sw3 is turned ON and the switching element sw4 is turned OFF through the driving circuit DRV2 at this time. Thus, the switching elements sw1 and sw4 are brought into the same state and the switching elements sw2 and sw3 are brought into the same state, and they reciprocally carry out an alternating operation.

Accordingly, while a voltage having a positive polarity is supplied to the first discharge lamp 6_1 by the ON/OFF operation of two sets of switching elements, for example, a voltage having a negative polarity is supplied to the second discharge lamp 6_2 (to the contrary, the voltage having a positive polarity is supplied to the second discharge lamp 6_2 while the voltage having a negative polarity is supplied to the first discharge lamp 6_1).

The signals sent from the control circuit 7A (which are indicated as "SD1" and "SD2" and the details thereof will be described below) are sent to the driving circuits DRV1 and DRV2 through isolators 9_1 and 9_2 respectively. More specifically, in the example shown in FIG. 6, a low potential side voltage (a ground potential) in each driving circuit is set to be output from the DC-DC converter 3'B for an output having a negative polarity. Therefore, an H (high) level and an L (low) level are defined for the voltage and an isolation is required for ON/OFF controlling the switching elements sw1 to sw4 upon receipt of the control signal (a binary condition signal). As a matter of course, if an IC for a bridge driver having an isolate function is used for each driving circuit, it is preferable that the control signal should be directly input to each driving circuit.

When a voltage to be supplied to one of the two discharge lamps has a positive polarity in the lighting circuit 1A, the switching control is carried out over the elements sw1 to sw4 such that a voltage to be supplied to the other discharge lamp has a negative polarity. Accordingly, if one of the discharge lamps has already been lighted up and the other discharge lamp is lighted up, the lighted discharge lamp is similarly controlled for a before-lighting polarity fixing period for the same discharge lamp. Accordingly, when the lighted discharge lamp is set in a stable state and the voltage polarity is fixed in this state for a long period of time, a burden (a thermal stress) to the electrode is increased.

In order to eliminate the drawbacks described above, it is preferable that the duration of the before-lighting polarity fixing period should not continue to exceed an allowable upper limit. For instance, an example of a circuit structure shown in FIG. 7 can be employed.

Figure 7:
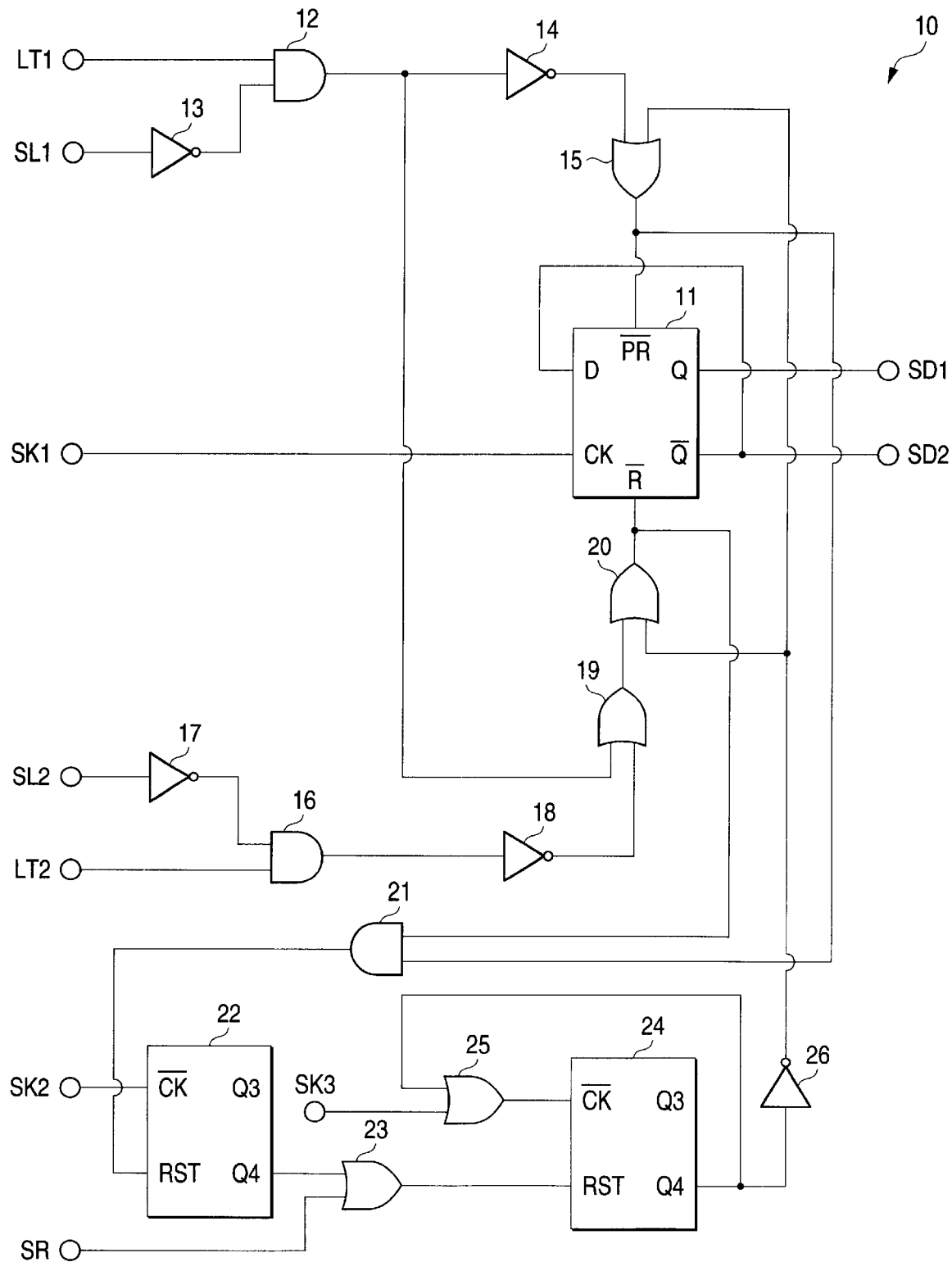
FIG. 7 is a circuit diagram showing an example of the structure of the main part of a control circuit.

FIG. 7 shows an example 10 of the structure of the main part of a portion for generating a control signal to be sent to the driving circuit (DRV1, DRV2) in the control circuit 7A and each signal used in FIG. 7 has the following meaning.

A signal "LT1" is a lighting indication signal for the discharge lamp 6_1.

A signal "LT2" is a lighting indication signal for the discharge lamp 6_2.

A signal "SL1" is a discrimination signal related to the lighting up/out state of the discharge lamp 6_1.

A signal "SL2" is a discrimination signal related to the lighting up/out state of the discharge lamp 6_2.

A signal "SK1" is a reference clock signal (for example, a rectangular wave signal having a frequency of 1 kHz).

A signal "SK2" is a reference clock signal (for example, a rectangular wave signal having a frequency of 500 Hz).

A signal "SK3" is a reference clock signal (for example, a rectangular wave signal having a frequency of 2 kHz).

A signal "SR" is a forced inversion indicating signal (when the signal has the H level, the polarity of a voltage to be supplied to the discharge lamp is temporarily inverted).

Referring to the signals LT1 and LT2, an instruction for lighting up the discharge lamp is given with the H level and an instruction for lighting out the discharge lamp is given with the L level. Referring to the signals SL1 and SL2, moreover, the lighting-up state of the discharge lamp is discriminated with the H level and the lighting-out state of the discharge lamp is discriminated with the L level. A circuit for discriminating the lighting up/out state has various configurations, for example, a circuit provided with a comparator in a latter stage as shown in FIG. 5 for comparing a detection current value with a predetermined reference value, thereby deciding the lighting up/out state of the discharge lamp or a circuit for detecting the amount of light emission of the discharge lamp to be compared with a reference value, thereby deciding the lighting up/out state.

After the signal "SK1" is generated by a clock signal generating circuit which is not shown, it is sent to the clock signal input terminal (CK) of a D flip-flop 11. The D flip-flop 11 comprises a preset terminal (indicated as "PR" having the symbol of a bar "") and a reset terminal (indicated as "R" having the symbol of a bar "") in a low active input, and a D input terminal thereof is connected to a Q bar output terminal (indicated as "Q" having the symbol of a bar ""). A Q output signal and a Q bar output signal become the control signals SD1 and SD2 to be sent to the driving circuits DRV1 and DRV2, respectively.

The lighting-up indication signal LT1 is supplied to one of the input terminals of a 2-input AND (logical product) gate 12 and the discrimination signal SL1 related to the discharge lamp 6_1 is supplied to the other input terminal of the gate through a NOT (logical negation) gate 13.

The output signal of the AND gate 12 is sent to one of the input terminals of a 2-output OR (logical sum) gate 15 through a NOT gate 14. The output signal of a counter (24) which will be described below is supplied to the other input terminal of the OR gate 15 through a NOT gate (26).

The output signal of the OR gate 15 is supplied to the preset terminal of the D flip-flop 11.

The lighting-up indication signal LT2 related to the discharge lamp 6_2 is supplied to one of the input terminals of a 2-input AND gate 16 and the discrimination signal SL2 related to the discharge lamp 6_2 is supplied to the other input terminal of the gate through a NOT gate 17.

The output signal of the AND gate 16 is sent to one of the input terminals of a 2-output OR gate 19 through a NOT gate 18. The output signal of the AND gate 12 is supplied to the other input terminal of the OR gate 19.

The output signal of the OR gate 19 is supplied to one of the input terminals of a 2-input OR gate 20 which is positioned in the latter stage and the output signal of the counter (24) which will be described below is supplied to the other input terminal of the gate 20 through a NOT gate (26).

The output signal of the OR gate 20 is supplied to the reset terminal of the D flip-flip 11.

Each of the output signals of the OR gates 15 and 20 is sent to a 2-input AND gate 21 and the output signal of the same gate is supplied to the reset terminal (RST) of a counter (binary counter) 22.

A signal SK2 is supplied from a clock signal generating circuit which is not shown to the clock signal input terminal (indicated as a low active input terminal having a symbol of a bar "" on "CK" in the drawing) of the counter 22. A frequency dividing signal obtained from an output terminal "Q4" of the counter is sent to one of the input terminals of a 2-input OR gate 23 in the latter stage (when an integer index indicative of a stage order is set to "i", "Qi" indicates an output terminal in an i stage).

The forced inversion indicating signal SR for the structure of a full bridge type circuit (switching elements sw1 to sw4) is supplied to the other input terminal of the 2-input OR gate 23 and the output signal of the same gate is supplied to the reset terminal (RST) of the counter (binary counter) 24 in the latter stage. An example of the structure of a generating circuit for the forced inversion signal SR will be described below in detail.

A signal SK3 is supplied from a clock signal generating circuit which is not shown to the clock signal input terminal (indicated as a low active input terminal having a symbol of a bar "" on "CK" in the drawing) of the counter 24 through a 2-input OR gate 25, and a signal is supplied from an output terminal Q4 of the counter 24 to the other input terminal of the gate 25. Moreover, a signal sent from the output terminal Q4 is supplied to the input terminals of the OR gates 15 and 20 through a NOT gate 26, respectively.

Figure 8:
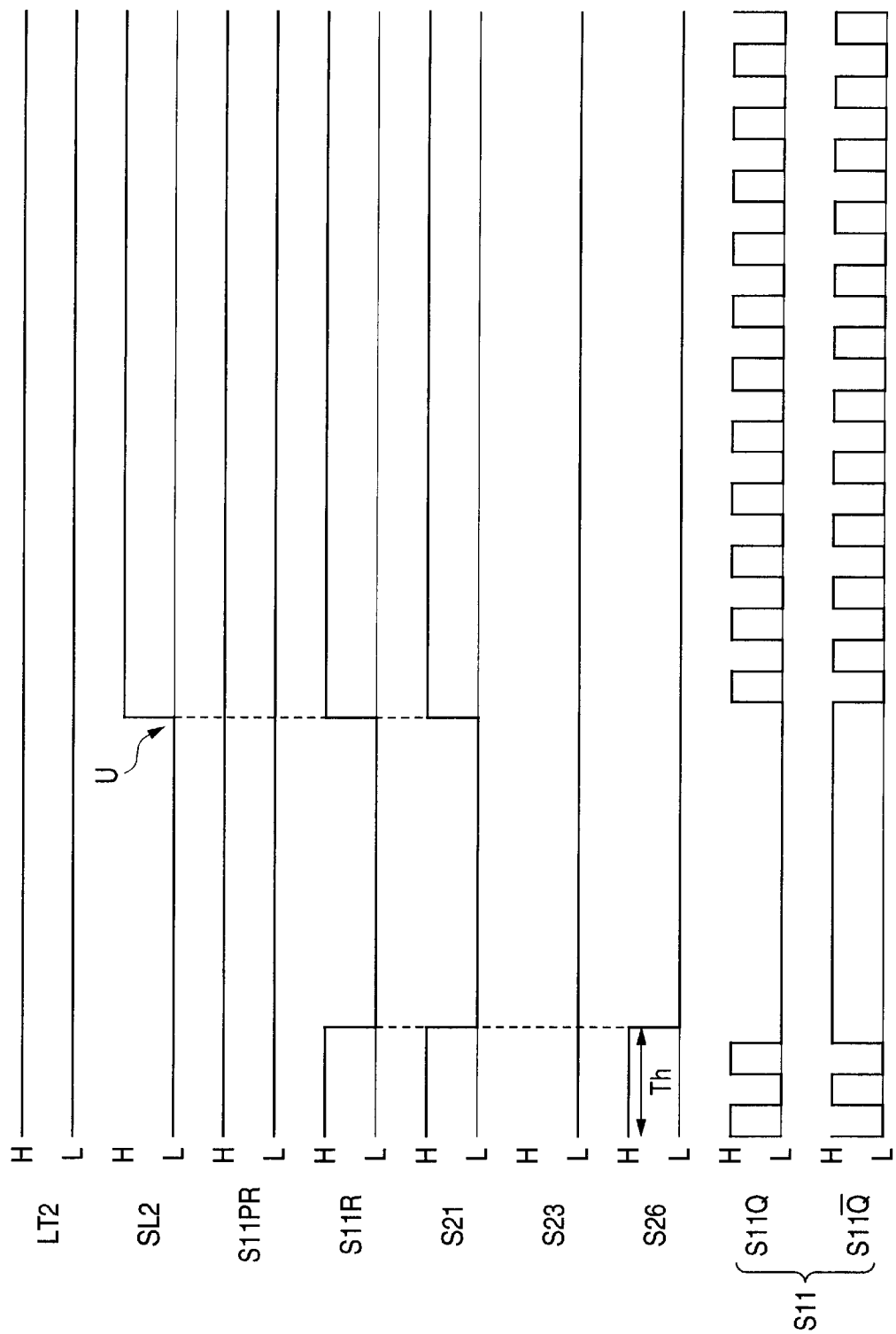
FIG. 8 is a timing chart illustrating the operation of the circuit shown in FIG. 7 together with FIG. 9, showing a situation in which the discharge lamp is normally lighted up.
Figure 9:
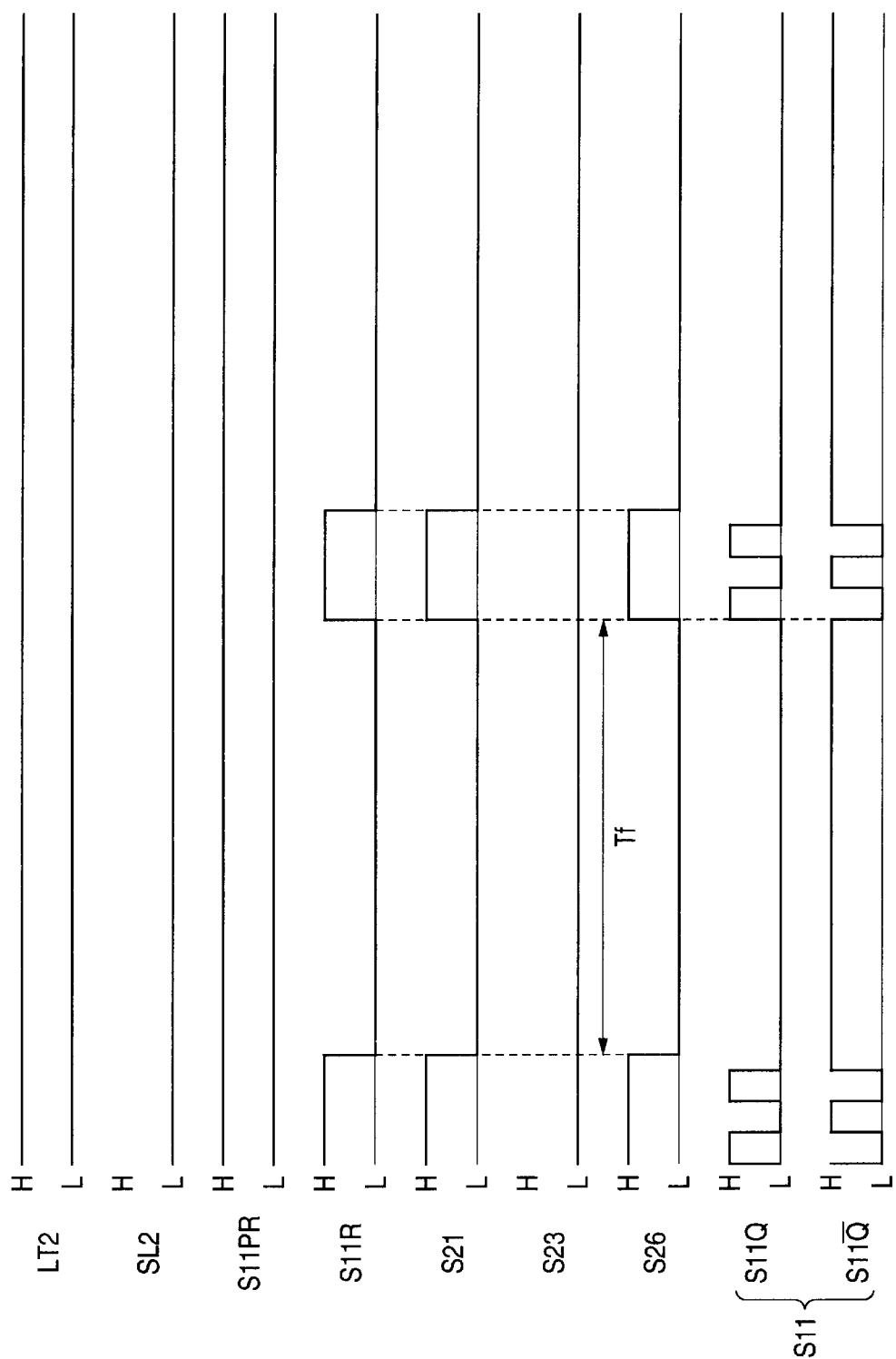
FIG. 9 is a chart illustrating a circuit operation to be carried out when the discharge lamp is not lighted up even if a predetermined time passes.

FIGS. 8 and 9 are timing charts showing a signal required for the description of the operation of the circuit. In the following, the description will be given on the assumption that the discharge lamp 6_1 has already been lighted up and the discharge lamp 6_2 is to be lighted up. In these drawings, each signal has the following meaning.

A signal "S11PR" is an input signal to the preset terminal of the D flip-flop 11.

A signal "S11R" is an input signal to the reset terminal of the D flip-flop 11.

A signal "S21" is an output signal of the AND gate 21.

A signal "S23" is an output signal of the OR gate 23.

A signal "S26" is an output signal of the NOT gate 26.

A signal "S11 " is an output signal of the D flip-flop 11 ("Q" indicates a Q output signal and a signal indicated as "Q" having the symbol of a bar "" is a Q bar output signal).

The signals "LT2" and "SL2" have been described above, and "H" indicates a high level and "L" indicates a low level in the drawing.

FIG. 8 is a diagram illustrating the operation of a circuit for a period including a time before the discharge lamp 6_2 is lighted up and a time after the discharge lamp 6_2 is lighted up without troubles.

Before the lighting-up, the signal LT2 is set to have the H level because an instruction for lighting up the discharge lamp 6_2 is given, and the signal SL2 has the L level because the discharge lamp 6_2 is lighted out. Accordingly, the output signal of the AND gate 16 has the H level, and is inverted (logically negated) through the NOT gate 18 and is then sent to the OR gate 19. Since the discharge lamp 6_1 is being lighted up as described above, the signals LT1 and SL1 are set to be the H level signals. Consequently, the output of the AND gate 12 is set to have the L level, and is inverted through the NOT gate 14 and is then supplied to the preset terminal of the D flip-flop 11 through the OR gate 15. For a period in which the output signal of the OR gate 19 has the L level and a signal S26 supplied from the counter 24 to the reset terminal of the D flip-flop 11 through the NOT gate 26 and the OR gate 20 has the H level (see "Th" in the drawing), moreover, the flip-flop 11 is not reset. Therefore, an alternating output (a half frequency dividing signal for the signal SK1) is obtained at the Q output terminal and the Q bar output terminal. When the same period passes, the signal S26 is set to have the L level so that the D flip-flop 11 is brought into a reset state.

Before the discharge lamp 6_2 is lighted up (a lighting-up time is indicated as an arrow "U" in FIG. 8), the signal S21 has the L level based on an AND operation of the signals S11PR and S11R.

The counting operation of the counter 22 is started when the signal S21 is changed from the H level to the L level.

While the Q4 output has the L level (for 16 milliseconds in the embodiment), the signal S23 has the L level. Therefore, the counter 24 in the latter stage is not reset (it is assumed that the signal SR has the L level).

While the signal S23 has the L level and the Q4 output has the L level, the counter 24 carries out the counting operation based on the signal SK3. However, the Q4 output is changed to have the H level after a predetermined time (4 milliseconds in the embodiment) passes, the counter 24 does not accept the signal SK3.

Thus, the signal S26 is supplied as the L level signal to the reset terminal of the D flip-flop 11 through the OR gate 20 and a state in which the flip-flop is maintained to be reset continues till the lighting-up time.

When the discharge lamp 6_2 is lighted up, the signal SL2 is set to have the H level. Therefore, the output signal of the AND gate 16 is changed to have the L level and a logical negation signal (H level signal) is supplied to the reset terminal of the D flip-flop 11 through the OR gates 19 and 20. Therefore, the reset of the flip-flop is released.

The signal S21 is changed to have the H level at the lighting-up time and is supplied to the reset terminal of the counter 22 so that the same counter is reset. Since the signal S23 has the L level, the counter 24 is maintained to count-up and the logical negation signal S26 of the Q4 output has the L level.

By releasing the reset of the D flip-flop 11, frequency dividing signals for the signal SK1 are obtained from the Q output terminal and the Q bar output terminal and are sent as the signals SD1 and SD2 to the driving circuits DRV1 and DRV2, respectively.

FIG. 9 is a diagram illustrating the operation of the circuit in a situation in which the discharge lamp 6_2 is not lighted up even if a predetermined time passes after the discharge lamp 6_2 has not been lighted up.

In this case, even if a period in which a defined time passes (indicated as "Tf" in the drawing) after the signals S11R, S21 and S26 are changed from the H level to the L level elapses, the discharge lamp 6_2 is not lighted up at all. Therefore, the signal SL2 is maintained to have the L level for the signal LT2 maintaining to have the H level.

Accordingly, the Q4 output of the counter 22 is set to have the H level, and the signals S11R and S21 are changed from the L level to the H level when the counter 24 in the latter stage is reset so that the signal S26 is changed to have the H level. Consequently, the counter 24 is also reset. As a result, an H level signal having a small pulse width is obtained as the signal S23.

While the signal S23 is changed from the H level to the L level, and the reset of the counter 24 is then released and the Q4 output thereof is set to have the H level, the signals S11R, S21 and S26 are set to have the H level. Therefore, the alternating outputs obtained from the Q output terminal and the Q bar output terminal in the D flip-flop 11 are sent to the driving circuits DRV1 and DRV2, respectively.

Then, when the signals S11R, S21 and S26 are set to have the L level, the D flip-flop 11 is brought into a reset state again.

While the structure in which a voltage having a specified frequency is supplied to the discharge lamp immediately after the discharge lamp is lighted up has been described in the example for simplicity, the voltage having a specified frequency is not supplied suddenly but the after-lighting polarity fixing period can be provided (the details thereof will be described below).

Moreover, it is preferable to detect that the discharge lamp is changed from the lighting-up state to the lighting-out state and to invert the polarity of a voltage supplied to the discharge lamp at that time. The reason is as follows. For example, in the case in which the polarity fixing period (the after-lighting polarity fixing period) is provided immediately after the discharge lamp is lighted up, the polarity obtained before the lighting-up is maintained to be fixed if the discharge lamp is lighted out for a first half of the same period. Therefore, there is a possibility that the polarity inversion might not be carried out permanently depending on circumstances.

Figure 10:
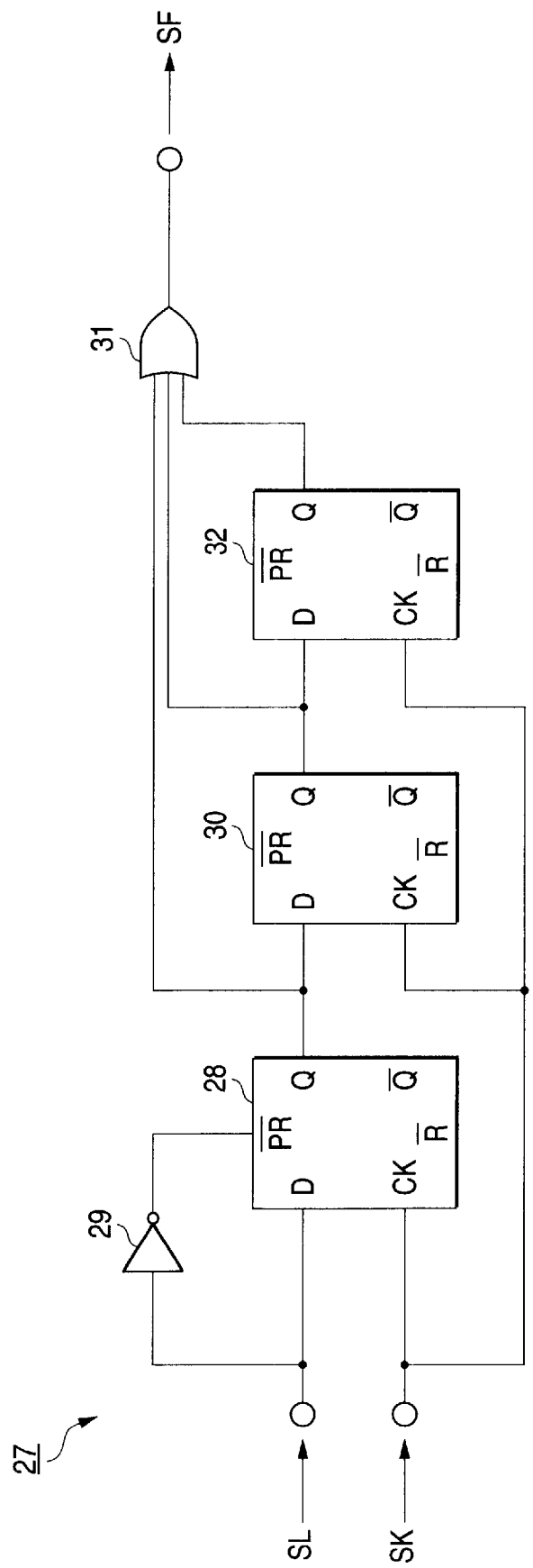
FIG. 10 is a diagram showing an example of a circuit for obtaining a signal SF having a detection sensitivity which is intentionally reduced based on a discrimination signal SL related to the turning on/off state of the discharge lamp.
Figure 12:
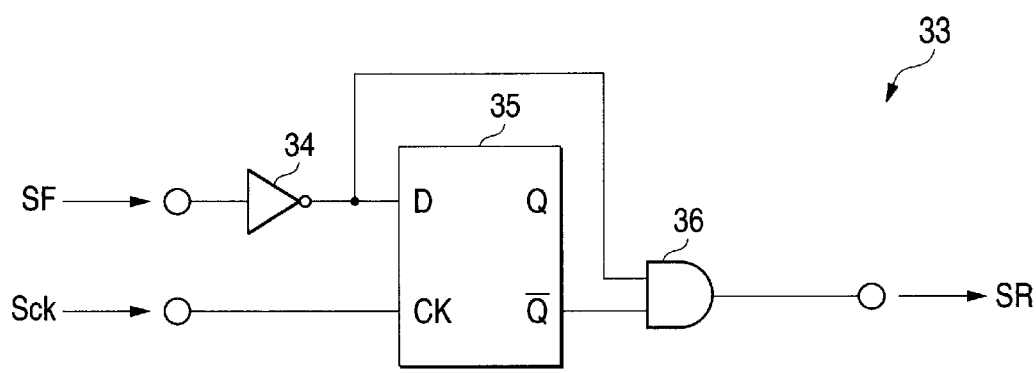
FIG. 12 is a circuit diagram showing an example of a circuit for generating a forced inversion indicating signal.

In order to avoid such a drawback, for example, it is preferable that an output signal obtained from an example of each circuit shown in FIGS. 10 and 12 should be utilized as the forced inversion indicating signal SR.

A signal will be described before the explanation of the structure of the circuit.

Figure 11:
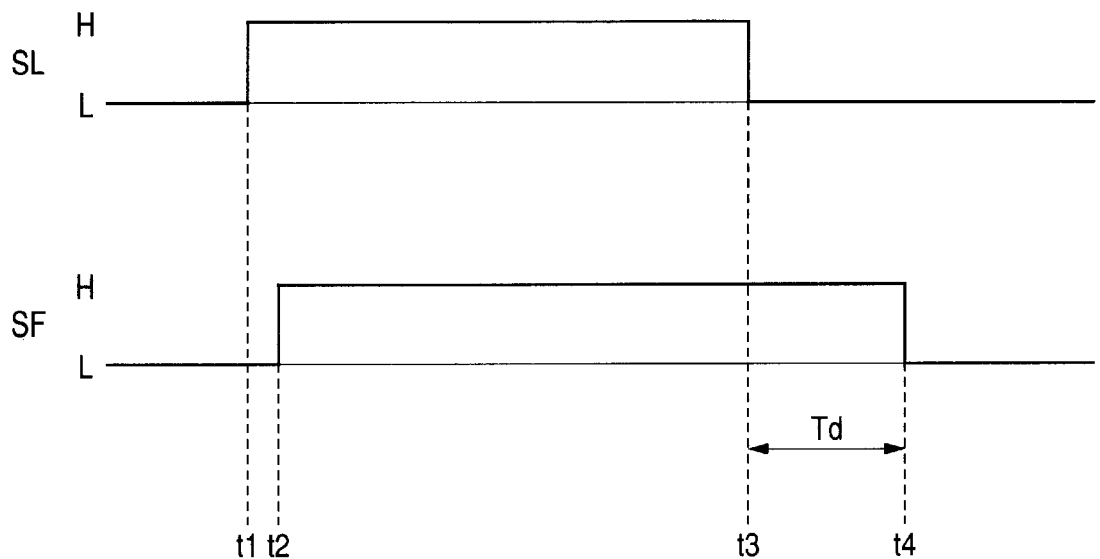
FIG. 11 is a timing chart showing the signals SL and SF in FIG. 10.

FIG. 11 shows a discrimination signal (indicated as "SL") for the lighting up/out state of the discharge lamp and a signal (indicated as "SF") generated based on the discrimination signal.

Both of the signals are common to each other in that the H level indicates the lighting-up state of the discharge lamp and the L level indicates the lighting-out state of the discharge lamp. However, a time of a change from the L level to the H level is indicated as "t1" in the signal SL and the signal SF is changed from the L level to the H level at a time "t2" delayed slightly from the time "t1", and furthermore, the duration of the H level period makes a difference therebetween. In other words, the signal width of the signal SF is greater than that of the signal SL by a period indicated as "Td" in the drawing (a period from a fall time of the signal SL which is indicated as "t3" to a time indicated as "t4"). The reason is that a detection sensitivity for a transition from the lighting-upstate of the discharge lamp to the lighting-out state thereof is to be reduced intentionally (For example, if a current flowing to the discharge lamp is instantaneously reduced so that the lighting-out state of the discharge lamp is decided, a malfunction caused by the frequent generation of a temporary discrimination signal or sensitive response control makes troubles. Therefore, it is necessary to avoid such a situation.) The response of the signal SF is more sensitive than that of the signal SL.

FIG. 10 shows an example of a circuit 27 for generating the signal SF in which three D flip-flops comprising preset and reset terminals to be low active inputs are connected in a longitudinal direction and an OR signal is obtained for the Q output signal of each flip-flop.

More specifically, the signal SL is supplied to the D input terminal of a D flip-flop 28 in a first stage and is supplied to the preset terminal (indicated as "PR" having the symbol of a bar "‾") through a NOT gate 29, and a clock signal (indicated as "SK") is input, to a clock signal input terminal (CK), from a signal generating circuit which is not shown.

The Q output signal of the D flip-flop 28 is sent to the D input terminal of a D flip-flop 30 in a next stage and to a 3-input OR gate 31.

The clock signal SK is supplied to the clock signal input terminal (CK) of the D flip-flop 30 and a Q output signal thereof is sent to the D input terminal of a D flip-flop 32 positioned in a final stage and to a 3-input OR gate 31.

Referring to the D flip-flop 32, similarly, the clock signal SK is supplied to a clock signal input terminal (CK) thereof and a Q output signal thereof is sent to the 3-input OR gate 31.

In the circuit 27, the D flip-flop 28 in the first stage is preset in response to a signal obtained by inverting the signal SL. In the meantime, therefore, a Q output to have the H level is obtained and is sequentially delayed synchronously with the rise time of the signal SK through the D flip-flops 30 and 32 after the next stage, and the signal SF is obtained as the OR signal of the Q output signal of each D flip-flop. As a result, a delay period Td is added to the signal SL as shown in FIG. 11.

FIG. 12 shows an example 33 of the structure of a circuit portion for generating the forced inversion indicating signal SR.

The signal SF is supplied to the D input terminal of a D flip-flop 35 through a NOT gate 34 and is supplied to one of the input terminals of a 2-input AND gate 36. A clock signal (indicated as "Sck") is input from a signal generating circuit which is not shown to the clock signal input terminal (CK) of the D flip-flop 35, and the Qbar output signal of the D flip-flop 35 is supplied to the other input terminal of the AND gate 36.

The output signal of the AND gate 36 becomes the signal SR to be sent to the OR gate 23 shown in FIG. 7. More specifically, it is apparent that the counter 24 is reset and the signal S26 is thereby set to have the H level for a period in which the signal SR has the H level and the inversion operation of the D flip-flop 11 is carried out with a frequency of 500 Hz for a predetermined time (4 milliseconds).

In the operation of the circuit, since the inversion signal of the signal SF is set to be the D input signal of the D flip-flop 35, the Q bar output signal is changed to have the H level synchronously with the rise time of a first clock signal Sck after the fall time of the D input signal and is changed to have the L level synchronously with the rise time of the first clock signal Sck after the rise time of the inversion signal of the signal SF. Accordingly, a signal SR to be an AND signal of the Q bar output signal and the inversion signal of the signal SF is a pulse signal which is changed to have the H level synchronously with the fall time of the signal SF and is changed to have the L level synchronously with the fall time of the Q bar output signal.

Figure 13:
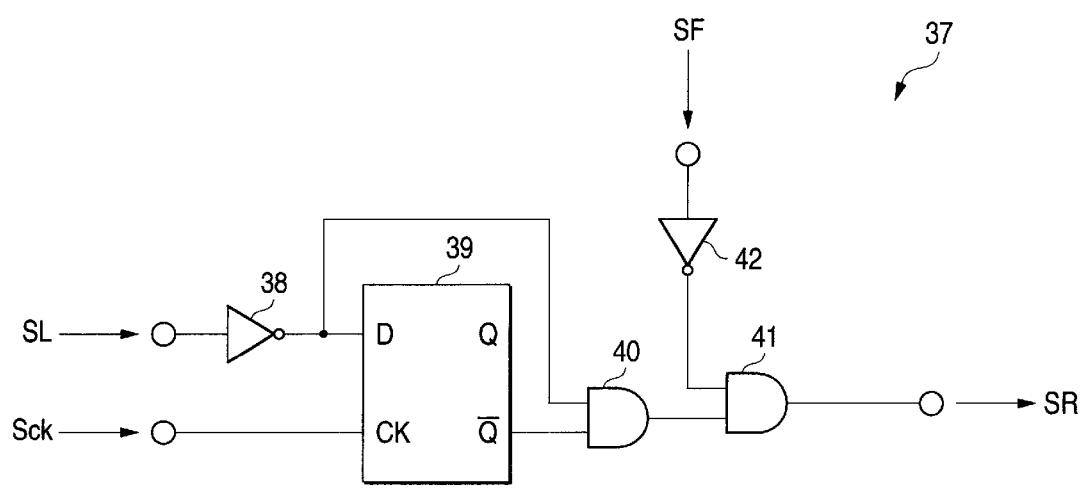
FIG. 13 is a circuit diagram showing another example of the circuit for generating a forced inversion indicating signal.

In addition, a structure example 37 shown in FIG. 13 can be employed for a circuit for generating a forced inversion indicating signal SR by utilizing both of the signals SL and SF when the discharge lamp breaks down and is not brought into a stable lighting state.

A difference between the example and the structure of FIG. 12 is made in the following manner.

A signal input to a NOT gate 38 is not the signal SF but the discrimination signal SL in the lighting up/out state of the discharge lamp, and the output signal of the gate is supplied to the D input terminal of a D flip-flop 39.

Another 2-input AND gate 41 is provided in the latter stage of an AND gate 40 to which the Q bar output signal of the D flip-flop 39 and the output signal of the NOT gate 38 are input, the output signal of the AND gate 40 is supplied to one of the input terminals of the gate and the signal SF is supplied to the other input terminal through a NOT gate 42, and the output signal of the AND gate 41 becomes the forced inversion indicating signal SR.

The circuit is operated such that the signal SR is generated during lighting-up in a short time in which the signal SF cannot respond. More specifically, the signal SF responds more insensitively than the signal SL in respect of a detection sensitivity in the lighting up/out state of the discharge lamp as described above. For example, therefore, there is generated such a situation that the signal SF still has the L level even if the signal SL is changed to be the pulse signal having the H level with a small width when the discharge lamp breaks down. In this case, the H level signal SL having a small width is inverted and is supplied to the D input terminal of the D flip-flop 39, and the clock signal Sck is supplied to the clock signal input terminal of the D flip-flop 39. Therefore, an H level signal having a small width is obtained at the Q bar output terminal of the D flip-flop 39 synchronously with the leading edge of the clock signal Sck and an AND operation result of the H level signal and the inversion (logical negation) signal of the signal SL and an AND operation output of the H level signal and the NOT signal (H level signal) of the signal SF become pulse signals to be sent to the OR gate 23 shown in FIG. 7. For a period in which the pulse signal has the H level, accordingly, the counter 24 is reset so that the signal S26 is set to have the H level and the inversion operation of the D flip-flop 11 is carried out with a frequency of 500 Hz for a predetermined time (4 milliseconds).

In the circuit structure shown in FIG. 7, the polarity of a voltage to be supplied to the discharge lamp is directly determined by each output of the D flip-flop 11. When an L level signal is supplied to the preset terminal of the D flip-flop 11 through each of the logic gates 12 to 15 related to the discharge lamp 6_1, the Q output signal is forcibly set to have the H level. Moreover, when the L level signal is supplied to the reset terminal of the D flip-flop 11 through each of the logic gates 16 to 20 related to the discharge lamp 6_2, the Q output signal is forcibly set to have the L level. Therefore, it is apparent that polarity specifying means is constituted by these circuit elements.

In the case in which the H level signal is supplied to the preset terminal and the reset terminal, the D flip-flop 11 carries out the inverting operation in response to a signal SK1. More specifically, an instantaneous pulse signal obtained when the Q4 output signal of the counter 22 to be the counting means is set to have the H level or the pulse signal SR sent from the circuits (33, 37) shown in FIGS. 12 and 13 is sent to the counter 24 through the OR gate 23. Consequently, the counter is rest. Therefore, the NOT signal of the Q4 output signal is set to have the H level and is supplied to the preset and reset terminals of the D flip-flop 11 through the OR gates 15 and 16. As a result, the inverting operation of the D flip-flop 11 is permitted for a period in which the set time of the counter 24 is determined. In other words, it is apparent that polarity inverting means is constituted by these circuit elements (21 to 26).

Thus, the duration of the before-lighting polarity fixing period is limited so as not to exceed a specified time. Therefore, a time required for maintaining the ON state of the switching element is limited in the circuit of the bootstrap type shown in FIG. 4, for example. Consequently, it is not necessary to increase the capacity of a capacitor.

Moreover, in the case in which one of the two discharge lamps has already been lighted up and the other discharge lamp is to be lighted up in the lighting circuit related to the two discharge lamps, the duration of the before-lighting polarity fixing period is limited. Therefore, it is possible to prevent an excessive thermal stress from being applied to the electrode of the discharge lamp.

Next, description will be given to the time limit for the after-lighting polarity fixing period of the discharge lamp.

Figure 14:
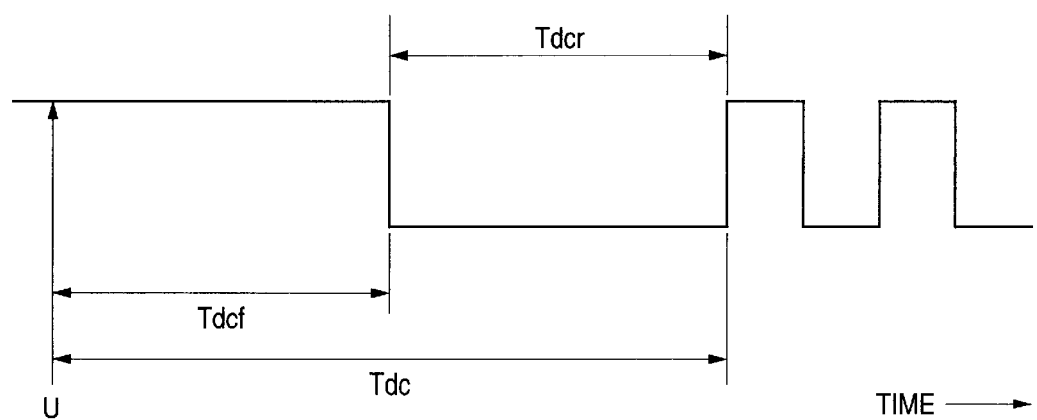
FIG. 14 is a diagram illustrating an after-lighting polarity fixing period.

FIG. 14 schematically shows a rectangular wave-shaped voltage to be supplied to the discharge lamp, illustrating the state of a transition to a specific lighting-up frequency after DC lighting up shown in the after-lighting polarity fixing period "Tdc" ("Tdcf" indicates a first half period and "Tdcr" indicates a second half period) on the assumption that the discharge lamp is lighted up at a time shown in an arrow U.

In the control, the duration of the period "Tdc" is changed depending on a current value.

As the value (set value) of a current-time product (=I·t) for a current value (I) and a time (t) is increased, the lighting performance of the discharge lamp is enhanced. On the other hand, there is a possibility that a discharge state might be unstable immediately after the discharge lamp is lighted up. Therefore, it is necessary to carefully set the product value. Moreover, in the case in which the duration of the period Tdc is too long, there is a possibility that a thermal stress might be applied to the electrode of the discharge lamp, thereby shortening a lifetime.

For example, if a current flowing to the discharge lamp has a value of 2 A on the assumption that "I·t=30 (A·mS)" is set, the duration of the period Tdc is set to 15 mS. Moreover, when the power supply capability of the lighting circuit is reduced due to a drop in a power voltage and the current flowing to the discharge lamp is set to have a value of 1.2 A, the duration of the period Tdc is increased to 25 mS. By deciding the state of the discharge lamp based on the current value to control a timing for polarity switching related to the output voltage of the DC-AC converting circuit (that is, the time of polarity switching is more delayed when the current value is smaller), it is possible to reduce the frequency of the light-out of the discharge lamp.

When the value of the current flowing to the discharge lamp is small, the following drawback is caused so that a countermeasure is to be taken.

For example, shortly after the discharge lamp is lighted out, it is warm. The case in which the discharge lamp is lighted up in such a state will be supposed.

Assuming that the current flowing to the discharge lamp has a value of 0.3 A, the duration of the DC light-up period is 100 mS based on the set value of the current-time product, which is very longer. Such a long duration does not remarkably influence the lifetime of the discharge lamp. For example, if the circuit structure of the bootstrap type shown in FIG. 4 is employed, a cost is increased disadvantageously.

In such a type, in the case in which the electric charges stored in the capacitor C3 are consumed or the quantity of electric charges is insufficient, the ON state cannot be maintained for an FET in an upper stage. Such a situation is caused by the leakage of the gate of the FET or in a bridge driving circuit and zero ampere is hard to obtain. Accordingly, as a time required form maintaining the ON state of the FET is more increased, it is necessary to set the electrostatic capacity of the capacitor C3 to be larger. Consequently, the cost is increased.

In order to eliminate the drawbacks described above, it is preferable that the duration of the after-lighting polarity fixing period should be determined by the current-time product, and furthermore, a time limit should be set such that the duration of the period does not continue beyond an upper bound value thereof. For example, an example of a circuit shown in FIG. 15 can be employed.

Figure 15:
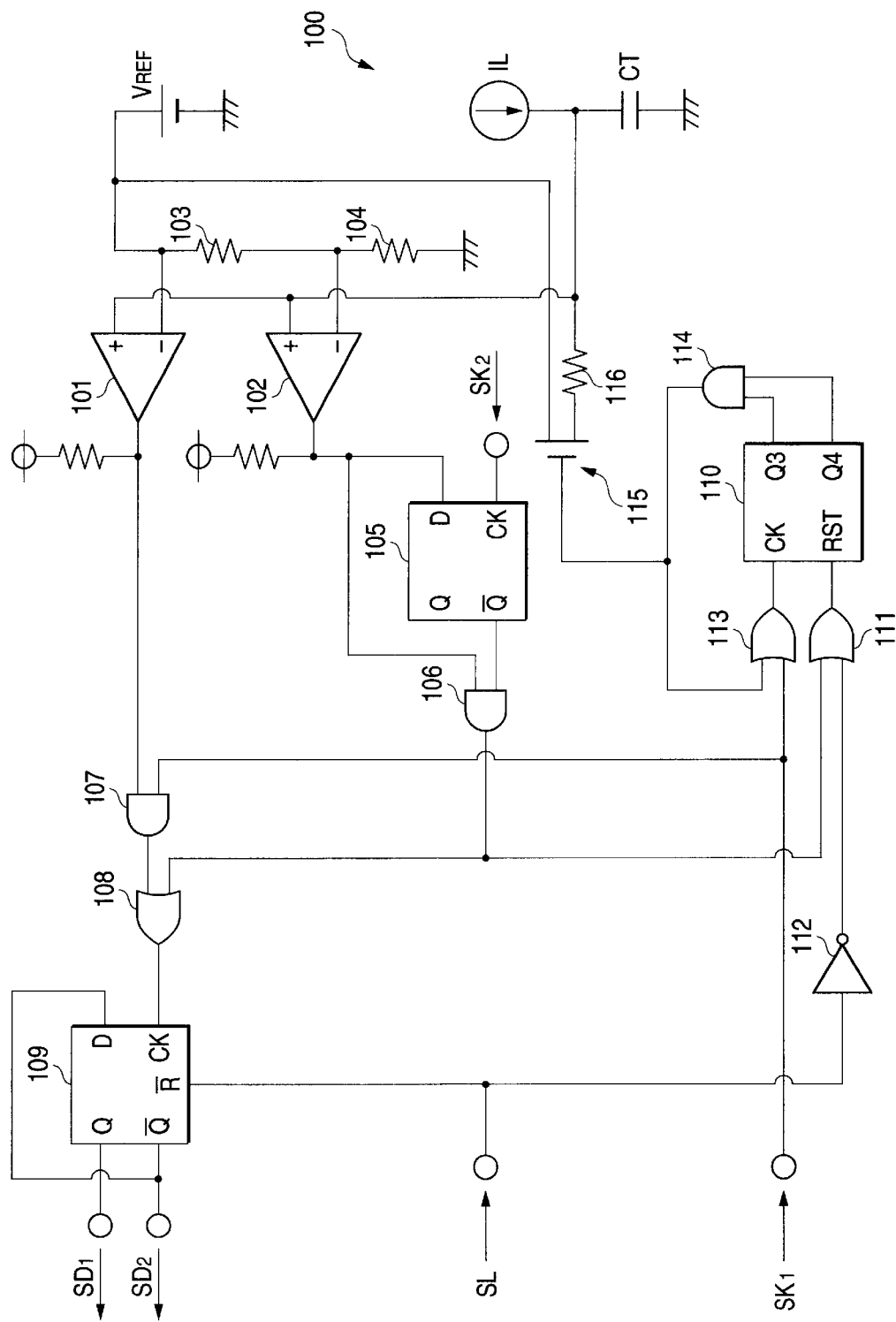
FIG. 15 is a circuit diagram showing an example of a circuit structure for control to limit the duration of the after-lighting polarity fixing period.

FIG. 15 shows a structure example 100 of the main part of a portion for generating a control signal to be sent to a driving circuit (DRV1, DRV2) in a control circuit (only a portion related to one of the discharge lamps is shown in the drawing).

Two comparators 101 and 102 are provided to compare, with a predetermined reference voltage, the terminal voltage of a capacitor CT to be charged by a current detection signal (represented by the symbol of a current source to be expressed as a current value in the drawing and having a current value designated as "IL") which is indicative of a current flowing to the discharge lamp.

The comparator 101 has a positive input terminal connected to one of the ends of the capacitor CT and a negative input terminal to which a predetermined reference voltage is supplied (which is indicated as the symbol of a constant voltage source in the drawing and has a voltage value indicated as "VREF"). Moreover, the comparator 102 has a positive input terminal connected to one of the ends of the capacitor CT and a negative input terminal connected to the voltage source VREF through a resistor 103 and grounded through a resistor 104. The resistors 103 and 104 have resistance values equal to each other.

A D flip-flop 105 is provided in the output stage of the comparator 102 and has a D input terminal to which the output signal of the comparator 102 is supplied. A clock signal is supplied, to the clock signal input terminal (CK) of the flip-flop, a clock signal (indicated as "SK2") from a signal generating circuit which is not shown.

In a 2-input AND (logical product) gate 106, a signal is supplied from the Q bar output terminal (indicated as Q having the symbol of a bar "" in the drawing) of the D flip-flop 105 to one of input terminals and the output signal of the comparator 102 is supplied to the other input terminal.

The output signal of the comparator 101 is sent to one of the input terminals of the 2-input AND gate 107 and a clock signal (indicated as "SK1") is supplied, to the other input terminal of the AND gate, from a signal generating circuit which is not shown. Each of the output signals of the AND gate 107 and the AND gate 106 is sent to a 2-input OR (logical sum) gate 108 and the output signal of the OR gate is supplied to the clock signal input terminal (CK) of a D flip-flop 109.

The D flip-flop 109 outputs a signal to be a control signal which is to be sent to the driving circuits DRV1 and DRV2, and a D input terminal thereof is connected to a Q bar output terminal and a signal obtained from the same terminal becomes a control signal SD2. Moreover, a signal obtained from the Q output terminal becomes a control signal SD1. The D flip-flop 109 has the reset terminal (indicated as R having the symbol of a bar "" in the drawing) of an L active input to which a status discrimination signal (indicated as "SL" and meaning the light-up of the discharge lamp with an H level and the light-out of the discharge lamp with an L level) is supplied from a lighting status discriminating circuit which is not shown (for example, a circuit in which a comparator is provided in the latter stage of the circuit shown in FIG. 5 to compare a detection current value with a predetermined reference value, thereby deciding whether the discharge lamp is lighted up or not).

In a counter (binary counter) 110 shown below the D flip-flop 105, the output signal of the AND gate 106 is supplied to a reset terminal (RST) through a 2-input OR gate 111. The status discrimination signal SL is supplied to the other input of the OR gate 111 through a NOT (logical negation) gate 112. Moreover, the clock signal SK1 is supplied to the clock signal input terminal (CK) of the counter 110 through a 2-input OR gate 113, and respective signals obtained from the output terminals (Q3 and Q4. "Qi" indicates an output terminal in an wth stage when an integer index indicating a stage order is represented by "i") of the counter 110 are sent to a 2-input AND gate 114.

The output signal of the 2-input AND gate 114 is sent to the OR gate 113 and to the control terminal (a gate in an FET) of an analog switch element 115 (a semiconductor element is indicated as an abbreviation such that a bipolar element and a unipolar element can be used in the drawing).

The analog switch element 115 has one of non-control terminals to which a predetermined voltage VREF is supplied, and the other non-control terminal connected to one of the ends of the capacitor CT through a resistor 116 and the positive input terminals of the comparators 101 and 102.

It is preferable that the clock signal SK1 should have a frequency of approximately 500 Hz, for example, and the clock signal SK2 should be set to have a frequency (several tens KHz) which is much higher than the lighting frequency of the discharge lamp.

Figure 16:
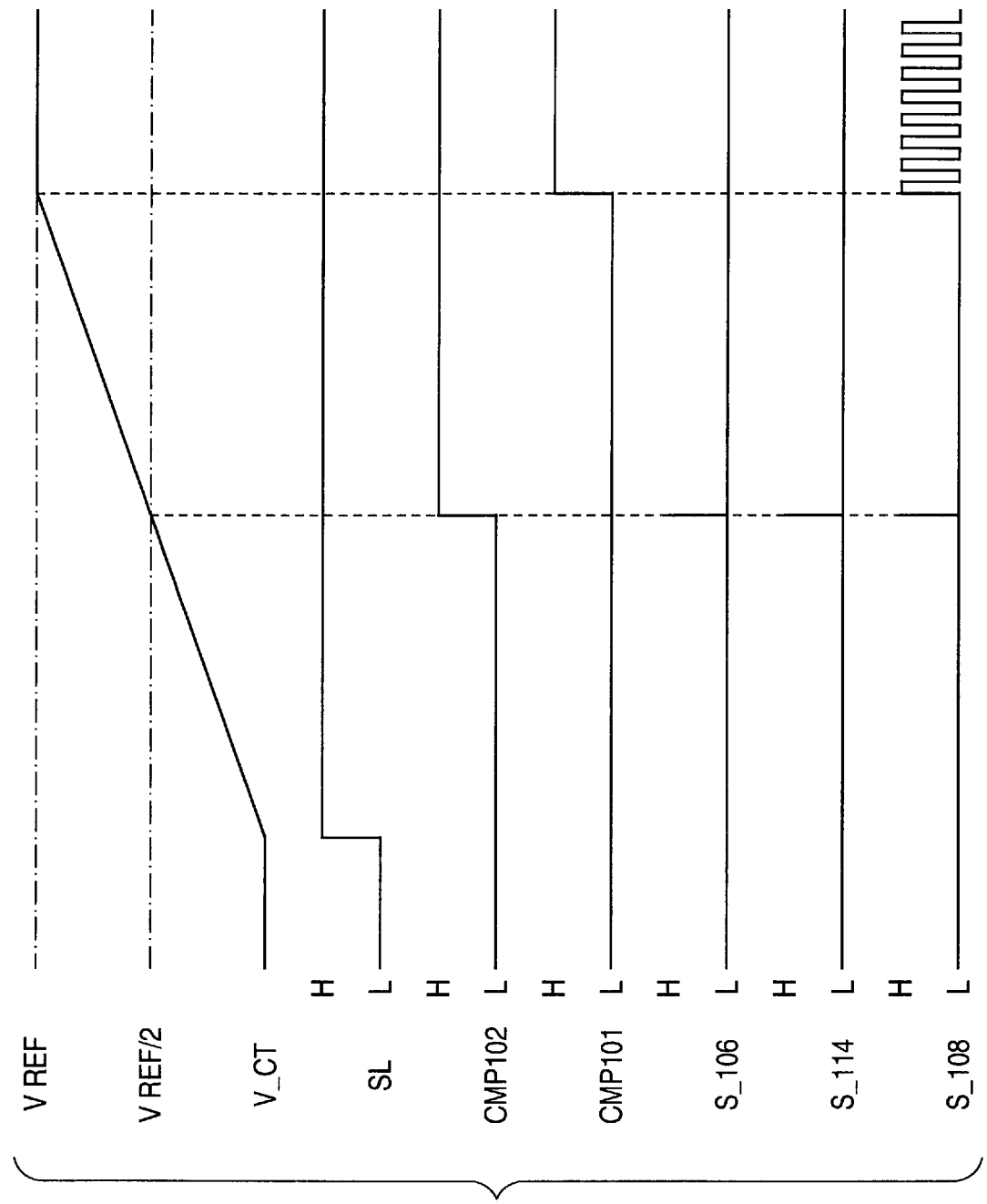
FIG. 16 is a diagram illustrating the operation of the circuit shown in FIG. 15 for a situation in which a time is not limited to the after-lighting polarity fixing period.
Figure 17:
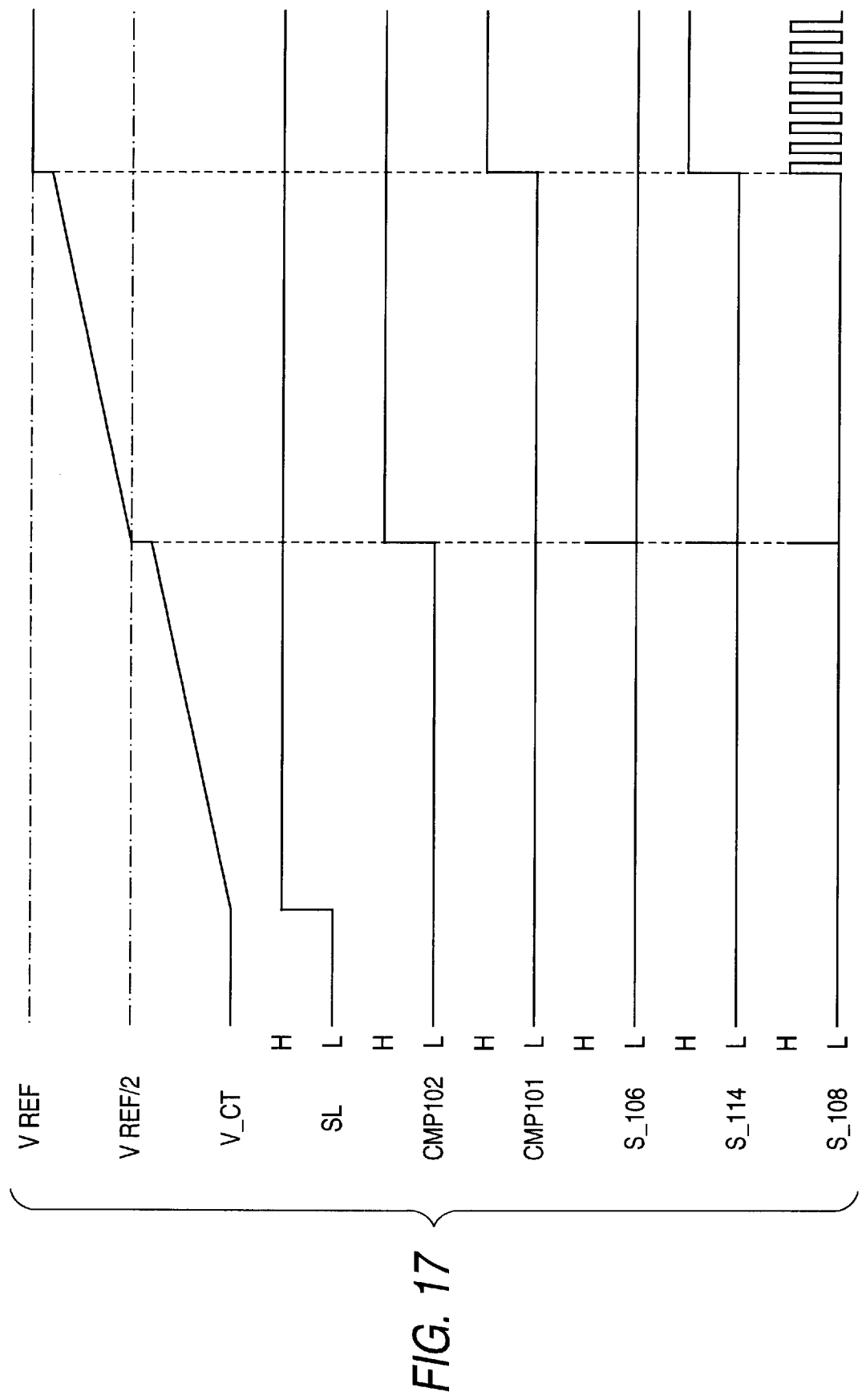
FIG. 17 is a diagram illustrating the operation of the circuit shown in FIG. 15 for a situation in which the time is limited to the after-lighting polarity fixing period.

FIGS. 16 and 17 show a main signal waveform in the circuit described above, and each signal has the following meaning.

A signal "VREF/2" is a half of a level of the reference voltage VREF.

A signal "V_CT" is a terminal potential of the capacitor CT.

A signal "CMP102" is an output signal of the comparator 102.

A signal "CMP101" is an output signal of the comparator 101.

A signal "S_106" is an output signal of the AND gate 106.

A signal "S_114" is an output signal of the AND gate 114.

A signal "S_108" is an output signal of the OR gate 108.

The signal "SL" has been described above, and "H" indicates a high level and "L" indicates a low level in the drawing.

In the circuit 10, a period in which the capacitor CT is charged and a terminal voltage thereof reaches VREF corresponds to an after-lighting polarity fixing period. As a current detection value related to the discharge lamp is increased, the charging time of the capacitor CT is shortened. Therefore, the durations of the periods Tdcf and Tdcr are correspondingly reduced.

FIG. 16 shows the operating situation of a circuit in the case in which a time is not limited for a DC lighting period (that is, the duration of a polarity fixing period determined by the current detection value of the discharge lamp is less than an upper bound value).

In the case in which the discharge lamp to be lighted up is lighted out, the status discrimination signal SL has the L level. Therefore, the D flip-flop 109 is reset so that a Q output signal thereof has the L level. The status discrimination signal SL is inverted to an H level signal through the NOT gate 112 and is supplied to the reset terminal RST of the counter 110 so that the counter 110 is brought into a reset state. Therefore, the output signal of the AND gate 114 positioned in the latter stage of the counter 110 has the L level (accordingly, the analog switch element 115 is set in an OFF state).

When the discharge lamp is then lighted up, the level of the status discrimination signal SL is changed to the H level and the reset of the D flip-flop 109 is released and is brought into a clock input waiting state. At the same time, the terminal voltage of the capacitor CT starts to be raised. Thereafter, when the terminal voltage reaches VREF/2, the output signal of the comparator 102 is set to have the H level so that a pulse having the H level is sent from the output of the AND gate 106. Consequently, the counter 110 is reset. At the same time, the output signal of the D flip-flop 109 is inverted. In other words, a period in which the discharge lamp is lighted up and the output of the D flip-flop 109 is then inverted is equivalent to the first half period Tdcf.

When the terminal voltage of the capacitor CT is further raised and finally reaches VREF, the output signal of the comparator 101 is set to have the H level. Accordingly, since an AND signal of the output signal and the clock signal SK1 is supplied to the clock signal input terminal of the D flip-flop 109 through the OR gate 108, a half frequency dividing output (a frequency=250 Hz) of the flip-flop is obtained as signals SD1 and SD2. For this period, that is, a period from "V_CT=VREF/2" to "V_CT=VREF" is equivalent to the second half period Tdcr.

The reset of the counter 110 is released when a signal sent from the NOT gate 112 has the L level (that is, the signal SL has the H level) and the output signal of the AND gate 106 has the L level, and the counter 110 starts a count-up operation upon receipt of the signal SK1. Then, the output signal of the AND gate 114 is set to have the H level when a reference time (24 milliseconds in the example) determined by the Q3 output signal and the Q4 output signal passes, and the same output signal is sent to the OR gate 113. Therefore, the count-up is stopped.

FIG. 17 shows the operating situation of the circuit in the case in which the time is limited to the DC lighting-up period (the duration of the polarity fixing period determined by the current detection value of the discharge lamp is equal to or more than an upper bound value thereof).

In this case, after the discharge lamp is lighted up, the degree of a rise in the terminal voltage of the capacitor CT is low (because a detection current value is small). Therefore, a time is taken until the terminal voltage reaches VREF/2. When the reference time passes, the output signal of the AND gate 114 is set to have the H level. Therefore, the analog switch element 115 is brought into an ON state. Consequently, since the capacitor CT is connected to a voltage source of VREF through the resistor 116, the terminal voltage V_CT is raised at a time. When the terminal voltage V_CT reaches VREF/2, the output signal of the comparator 102 is set to have the H level. Accordingly, the counter 110 is reset and the inverting operation of the D flip-flop 109 is carried out in the same manner as described above.

When the output signal of the AND gate 114 is set to have the L level, the terminal voltage V_CT is then raised gradually again and the reference time passes, the output signal of the AND gate 114 is set to have the H level. Therefore, the analog switch element 115 is brought into the ON state. Consequently, when V_CT is raised at a time and reaches VREF, the output signal of the comparator 101 is set to have the H level. As described above, therefore, the frequency dividing output of the D flip-flop 109 is obtained as the signals SD1 and SD2.

In the circuit described above, the counter 110 is provided as means for counting a reference time in order to limit the durations of the periods Tdcf and Tdcr within a predetermined reference time, and the capacitor CT is forcibly charged through the analog switch element 115 when the reference time passes, thereby constituting time limiting means (including 110, 115 and 116). Therefore, also in the case in which the current detection value related to the discharge lamp is small, the function of the time limit is fulfilled such that the DC lighting periods (Tdcf, Tdcr) do not continue unnecessarily.

In the circuit of the bootstrap type shown in FIG. 4, accordingly, a time required for maintaining the ON state of the switching element is also limited. Therefore, it is not necessary to increase the capacity of the capacitor.

Moreover, in the case in which one of the two discharge lamps has already been lighted up and the other discharge lamp is lighted up in the lighting circuit related to the two discharge lamps, the after-lighting polarity fixing period is limited. Therefore, the application of a thermal stress to an electrode can be suppressed.

The set value of the reference time (limited time) is to be determined in consideration of an influence on the lifetime of the discharge lamp and a lighting performance (In other words, the lifetime of the lighted discharge lamp might be reduced due to the set of the reference time to be unnecessarily long and the capacity of a bootstrap capacitor is unavoidably increased. To the contrary, if the reference time is too short, the lighting performance might be deteriorated. Therefore, it is preferable that the reference time should be determined in consideration of both matters.). While the circuit structure is simplified by setting the reference time values of the periods Tdcf and Tdcr to be equal to each other in the example described above, it is a matter of course that different reference time values may be set for the periods, respectively.

While the method of limiting a time for the before-lighting polarity fixing period or the after-lighting polarity fixing period has been described above, a countermeasure against a deterioration in the discharge lamp or a reduction in the lifetime cannot be taken perfectly as described above. Therefore, it is desirable that the current flowing to the discharge lamp should be controlled so as not to exceed a predetermined limit current value for each of the polarity fixing periods. In other words, in the case in which the discharge lamp is to be well lighted up, it is effective that a polarity fixing period in which the polarity of a voltage to be supplied from the DC-AC converting circuit to the discharge lamp is defined to be positive or negative is provided before or after lighting-up or before and after lighting-up. In addition, it is possible to prevent the deterioration in the discharge lamp as much as possible by limiting the maximum value of the current flowing to the discharge lamp for the before-lighting polarity fixing period or the after-lighting polarity fixing period. More preferably, if a product of the current value of the discharge lamp for the polarity fixing periods and the upper limit of the time for the same periods is set to be equal to or smaller than a current-time product permitted for the discharge lamp, it is possible to light up the discharge lamp with an optimum supply current and time. For example, in the case in which a plurality of discharge lamps are to be lighted up, it is possible to prevent an excessive current from being supplied to the lighted discharge lamps.

Figure 18:
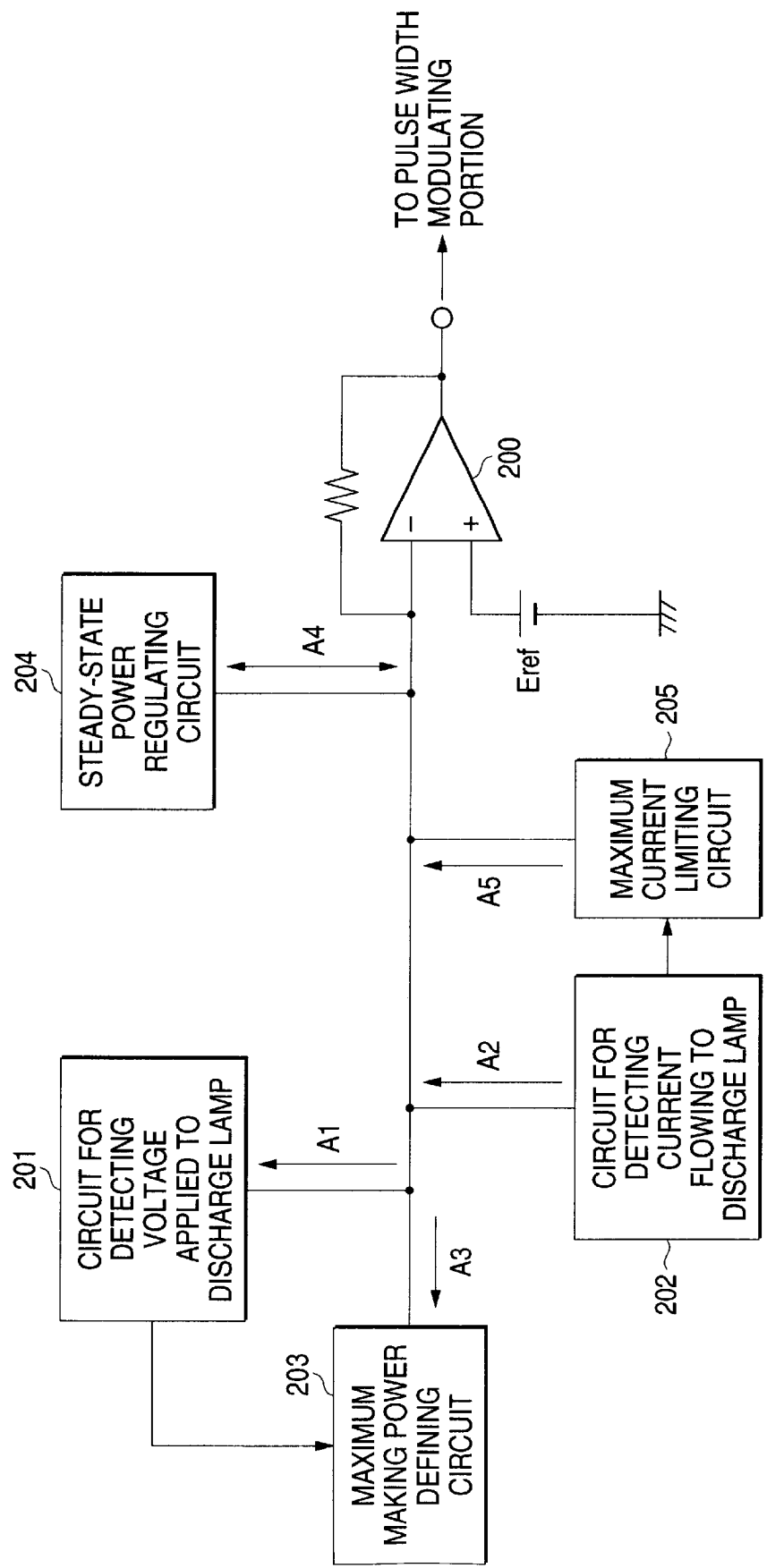
FIG. 18 is a diagram showing the structure of the main part of a control circuit for the lighting control of the discharge lamp.

FIG. 18 is a diagram illustrating a control circuit using PWM (pulse width modulation) control method. Since the output control of a DC-DC converting circuit using the PWM control is well known (as a matter of course, application to another control method can be carried out), a main part thereof is shown. FIG. 18 shows an example of the circuit for one discharge lamp. It is apparent from the following description that the circuit can easily be expanded for a plurality of discharge lamps.

A predetermined reference voltage "Eref" (indicated by the symbol of a constant voltage source in the drawing) is supplied to the positive side input terminal of an error amplifier 200 and the following circuits are connected to a negative side input terminal (the numerals in parentheses indicate designations).

A circuit for detecting a voltage to be applied to a discharge lamp (201), a circuit for detecting a current flowing to a discharge lamp (202), a maximum making power defining circuit (203), a steady-state power regulating circuit (204), and a maximum current limiting circuit (205).

The voltage detecting circuit 201 and the current detecting circuit 202 serve to detect a voltage and a current for the discharge lamp.

In the case in which the lighting control of the discharge lamp is divided into a transient area in which the discharge lamp has not been stabilized and a steady-state area in which steady-state lighting-up is carried out, the maximum making power defining circuit 203 serves to define a maximum supplied power value (or an upper bound permitted value) in the transient area in the case in which the discharge lamp is to be lighted up in a cold state (a so-called cold start). Moreover, the steady-state power regulating circuit 204 is required for finely controlling a supplied power value in constant power control in the stead-state area.

The maximum current limiting circuit 205 is provided to place restrictions such that a current flowing to the discharge lamp for the before-lighting polarity fixing period or the after-lighting polarity fixing period or both periods does not exceed a predefined current value as a maximum value upon receipt of a detection signal sent from the circuit 202 for detecting a current flowing to the discharge lamp.

In the structure, if the output voltage of the error amplifier 200 is raised, the power to be supplied to the discharge lamp is increased (the error amplifier regulates the output voltage of a DC power circuit such that the negative side input voltage of the error amplifier is equal to a reference voltage Eref), and the output voltage of the error amplifier 200 is converted into a control signal to be sent to a switching element (a semiconductor element) in a DC power circuit (a DC-DC converting circuit) through a PWM control portion which is not shown (a circuit portion constituted by using a general purpose IC for PWM control and serving to generate a pulse signal changing a duty cycle corresponding to the result of comparison of the levels of an input voltage and a saw tooth wave) or a driving circuit. In the case of application to PFM (pulse frequency modulation) control, it is preferable that the output of the error amplifier 20 should be sent to a circuit portion required for the control.

Moreover, arrows indicated as A1 to A5 in the drawing represent the contribution of each portion to a current input to the error amplifier 200, and the direction of each arrow indicates a reference of the direction of a control current in each portion. For example, the directions of control currents are set apart from the error amplifier 200 (the direction of a current sink) in the voltage detecting circuit 201 (see the arrow A1) and the maximum making power defining circuit 203 (see the arrow A3). Therefore, as the value of the current flowing in the same direction is increased, the power to be supplied to the discharge lamp is raised. To the contrary, the directions of control currents are set closer to the error amplifier 200 (the direction of a current source) in the current detecting circuit 202 (see the arrow A2) and the maximum current limiting circuit 205 (see the arrow AS). Therefore, as the value of the current flowing in the same direction is increased, the power to be supplied to the discharge lamp is reduced. Referring to the control current in the steady-state power regulating circuit 204, the power can be regulated in any direction as shown in the arrow A4. In the case in which the power is regulated in such a direction as to be apart from the error amplifier 200, the power supplied in the steady-state area is increased (To the contrary, if the power is regulated in such a direction as to be closer to the error amplifier, the power supplied in the steady-state area is decreased.).

In the transient area, the power to be supplied to the discharge lamp is defined depending on the lighting state of the discharge lamp by the contribution of the control current through the voltage detecting circuit 201, the current detecting circuit 202 and the maximum making power defining circuit 203. For example, if a voltage applied to the discharge lamp is low, a large power is applied to the discharge lamp (a maximum power value is determined by referring to a detected voltage as is apparent from the arrow set from the voltage detecting circuit 201 toward the maximum making power defining circuit 203). Moreover, if the current flowing to the discharge lamp is increased, the power to be supplied to the discharge lamp tends to be decreased.

Referring to the constant power control in the steady-state area of the discharge lamp, it is well known that the control is carried out to establish an equation of "V·I=W" or an equation of "V+I=W" obtained from linear approximation, wherein a lamp voltage is represented by "V", a lamp current is represented by "I" and a rated power value is represented by "W" (it is preferable that the structures of the voltage detecting circuit and the current detecting circuit should be complicated to carry out approximation for a constant power curve by using a large number of polygonal lines in order to enhance the approximation and it is necessary to consider demerits caused by an increase in the number of parts.

It can be supposed that the control current is not generated by the maximum making power defining circuit 203 in the steady-state area. Therefore, the control is carried out such that the sum of the control currents of the voltage detecting circuit 201, the current detecting circuit 202 and the steady-state power regulating circuit 204 is zero ampere (More specifically, an input voltage and a reference voltage in the error amplifier 200 are balanced in this state. In the case in which the balance is lost, the output voltage of the amplifier is raised and the supplied power is increased if the input voltage is dropped, and the output voltage of the amplifier is dropped and the supplied power is decreased if the input voltage is raised, for example).

As described above, the maximum current limiting circuit 205 takes part in the current limitation of the discharge lamp for the before-lighting polarity fixing period or the after-lighting polarity fixing period when the discharge lamp is to be activated. In the case in which the detected value of the current flowing to the discharge lamp for the period exceeds a predetermined threshold, a current flows in a direction shown in the arrow A5. As a result, the value of the current flowing to the discharge lamp is limited.

Figure 19:
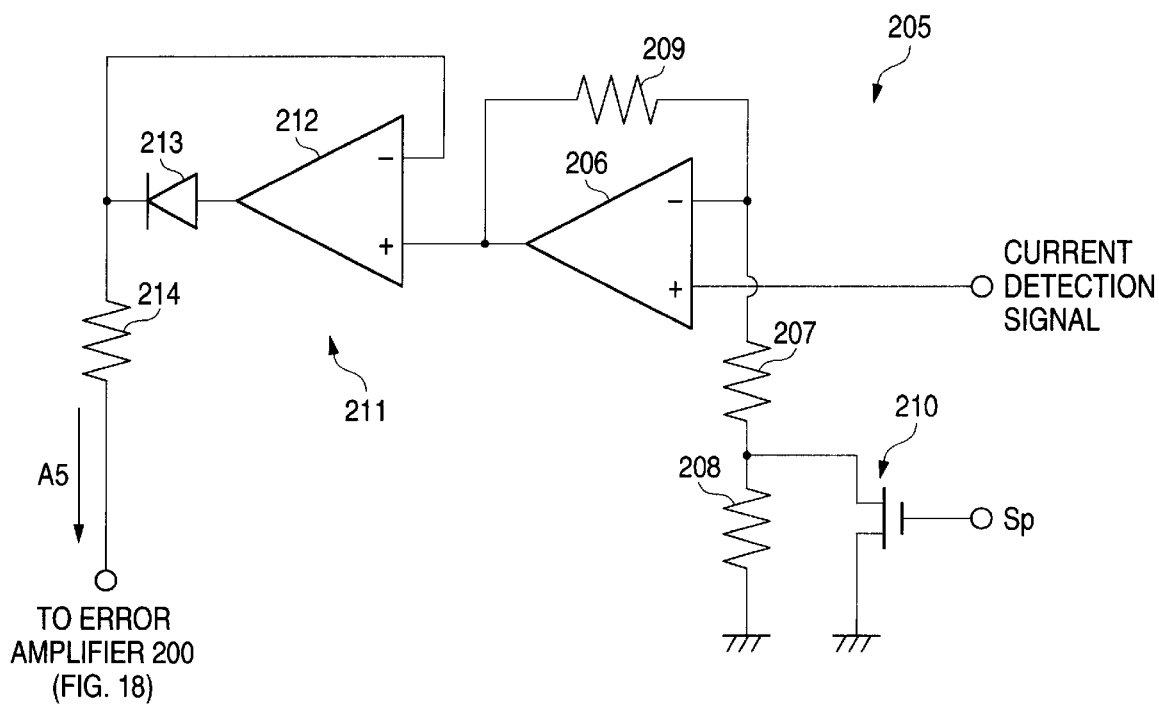
FIG. 19 is a circuit diagram showing an example of the structure of a maximum current limiting circuit.
Figure 20:
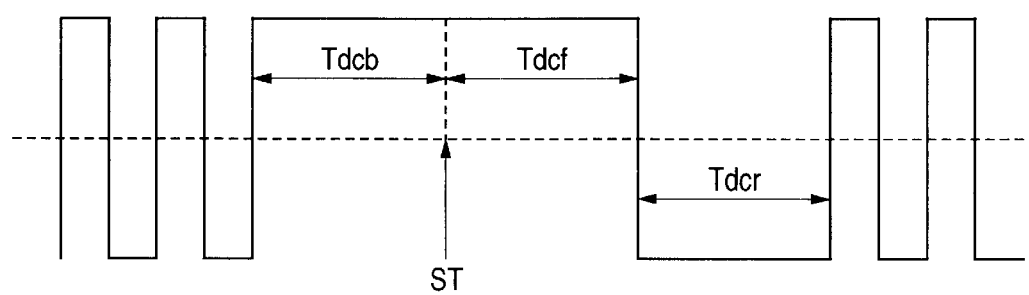
FIG. 20 is a diagram schematically showing the current waveform of a rectangular wave output supplied to the discharge lamp.

FIG. 19 shows an example of the structure of the maximum current limiting circuit 205 for strictly limiting the current for the polarity fixing period.

An operational amplifier 206 has a non-inversion input terminal to which a detection signal (tDET described above) is supplied as a DC voltage from the current detecting circuit of the discharge lamp, and an inversion input terminal which is grounded through resistors 207 and 208 connected in series and is connected to the output terminal of the operational amplifier 206 through a resistor 209.

Referring to a switch element 210 provided in parallel with the resistor 208 (which is indicated by an abbreviation in the drawing and for which the analog switch of a field effect transistor is used), ON/OFF control is carried out in response to a deciding signal (indicated as "Sp") representing the before-lighting polarity fixing period or the after-lighting polarity fixing period. If the before-lighting polarity fixing period or the after-lighting polarity fixing period is decided, the switch element 210 is brought into an ON state and the node of the resistors 207 and 208 is set to have a ground potential. In order to detect that the before-lighting polarity fixing period is set, it is preferable that the signal S2 shown in FIG. 8 should be utilized, and the period in which the same signal is set to have the L level is the before-lighting polarity fixing period (The logical negation signal of S21 is preferably used for the deciding signal). In order to detect that the after-lighting polarity fixing period is set, moreover, one of the output signals of the two comparators 101 and 102 shown in FIG. 15 has an L' level and a period in which the lighting signal SL has the H level is the after-lighting polarity fixing period (It is preferable to use, as the deciding signal, an AND signal of an OR signal of the logical negation signal of the CMP 101 and that of the CMP 102 and the signal SL or an AND signal of the logical negation signal of an AND signal of the CMP 101 and the CMP 102 and the signal SL.).

The output signal of the operational amplifier 206 is sent to the non-inversion input terminal of the operational amplifier 212 constituting a buffer 211 in a latter stage. A forward diode 213 is connected to the output terminal of the operational amplifier 212 and the cathode of the diode is connected to the negative input terminal of the error amplifier 200 through a resistor 214 and is connected to the inversion input terminal of the operational amplifier 212.

In the case in which the before-lighting polarity fixing period or the after-lighting polarity fixing period is detected in the circuit, the switch element 210 is brought into an ON state so that the amplification rate of the operational amplifier 206 is increased. As compared with the case in which the switch element 210 is set in an OFF state, consequently, the current shown in the arrow AS starts to flow with a smaller current. Consequently, the current flowing to the discharge lamp is limited so that a current value is reduced.

In order to limit the current such that a current-time product is equal to or smaller than a specified value for the before-lighting polarity fixing period and the after-lighting polarity fixing period, it is preferable that an OR signal of the deciding signals for the polarity fixing periods should be supplied to the switch element 210. Moreover, the current is limited such that the current-time product is equal to or smaller than the specified value for the first half of each of the before-lighting polarity fixing period and the after-lighting polarity fixing period (see "Tdcf" in FIG. 14) (that is, the current-time product for a period with the same polarity does not exceed the specified value). Thus, it is a matter of course that various embodiments can be employed.

As is apparent from the above description, according to the first aspect or the invention, it is possible to guarantee an excellent lighting-up property of the discharge lamp by fixing the polarity of the voltage to be supplied to the discharge lamp before the discharge lamp is lighted up or immediately after the discharge lamp is lighted up, and furthermore, to prevent a deterioration from being caused by a thermal stress applied to the discharge lamp by limiting the value of a current flowing to the discharge lamp for the polarity fixing period. For example, accordingly, when a first discharge lamp has already been lighted up and a second discharge lamp is to be lighted up, the output polarity for the second discharge lamp is controlled to be temporarily fixed. Consequently, it is possible to lessen the influence of the thermal stress applied to the first discharge lamp, thereby preventing a deterioration and a reduction in a lifetime.

According to the second and third aspects of the invention, a period duration for temporarily fixing the polarity of the voltage to be supplied to the discharge lamp is limited. Consequently, when one of the discharge lamps has been lighted up and the other discharge lamp is to be lighted up, the polarity fixing state of the former discharge lamp does not continue unnecessarily for a long time. Therefore, there is no possibility that an excessive thermal stress might be applied to the electrode of the discharge lamp. Moreover, the current-time product of the discharge lamp for the polarity fixing period is set to be less than the current-time product permitted for the discharge lamp. Consequently, it is possible to take a sufficient countermeasure against bad effects produced by the thermal stress.

What is claimed is:

1. A discharge lamp lighting circuit comprising:

a DC power circuit for outputting DC voltages having positive and negative polarities; and a DC-AC converting circuit for converting an output voltage of the DC power circuit into an AC voltage through a plurality of switching elements and then supplying the AC voltage to a plurality of discharge lamps, wherein in the case in which the discharge lamp is to be lighted up, a polarity fixing period is set to define a polarity of a voltage to be supplied from the DC-AC converting circuit to the discharge lamp before or after the discharge lamp is lighted up or before and after the discharge lamp is lighted up to be positive or negative, and a current flowing to the discharge lamp for the period is controlled so as not to exceed a predetermined limit current value.

2. The discharge lamp lighting circuit according to claim 1, further comprising polarity inverting means for forcibly inverting the polarity of the voltage if a predefined upper limit time is exceeded for the polarity fixing period of the discharge lamp, a product of a current value of the discharge lamp for the polarity fixing period and the upper limit time being set to be equal to or smaller than a current-time product permitted for the discharge lamp.

3. The discharge lamp lighting circuit according to claim 2, wherein voltages having positive and negative polarities which are output from two output terminals of the DC power circuit are sent to the DC-AC converting circuit, two pairs of switching elements provided in the DC-AC converting circuit to switch the output voltages of the DC power circuit have circuit structures of a full bridge type, and an AC voltage generated by alternating operating each of the switching elements through a driving circuit thereof in pairs is supplied to each of the discharge lamps, and in the case in which one of the discharge lamps is to be lighted up, a state of the switching element is temporarily fixed such that the polarity of the voltage to be supplied from the DC-AC converting circuit to the discharge lamp is defined to be positive or negative before or after the discharge lamp is lighted up and the alternating operation of the switching element is carried out after the discharge lamp is lighted up or after the discharge lamp is lighted up and the polarity fixing period passes.

* * * * *